United States Patent
Baudisch et al.

(10) Patent No.: US 7,424,218 B2
(45) Date of Patent: Sep. 9, 2008

(54) REAL-TIME PREVIEW FOR PANORAMIC IMAGES

(75) Inventors: Patrick Baudisch, Seattle, WA (US); Chris Pal, Cambridge (CA); Eric Rudolph, Redmond, WA (US); Drew Steedly, Redmond, WA (US); Richard Szeliski, Bellevue, WA (US); Desney Tan, Kirkland, WA (US); Matthew Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 11/193,091

(22) Filed: Jul. 28, 2005

(65) Prior Publication Data

US 2007/0025723 A1   Feb. 1, 2007

(51) Int. Cl.
*G03B 41/00* (2006.01)
*G03B 13/02* (2006.01)
*H04N 5/222* (2006.01)

(52) U.S. Cl. .......................... 396/322; 396/374; 348/36; 348/218.1; 348/333.04; 348/333.05

(58) Field of Classification Search ................. 396/322, 396/373, 374, 439; 352/70; 348/36, 218.1, 348/333.01–333.05, 333.11, 333.12
See application file for complete search history.

(56) References Cited

U.S. PATENT DOCUMENTS 5,982,951 A * 11/1999 Katayama et al. ........... 382/284
6,112,033 A    8/2000 Yano
6,195,204 B1   2/2001 Nalwa (Continued)

FOREIGN PATENT DOCUMENTS

EP    1162830    12/2001

(Continued)

OTHER PUBLICATIONS

Mann, S. and Picard, R. W. (1994). Virtual bellows: Constructing high-quality images from video. In Proc of First IEEE International Conference on Image Processing (ICIP-94), pp. 363-367, Austin, TX.

(Continued)

*Primary Examiner*—W. B. Perkey
*Assistant Examiner*—Rishi S Suthar
(74) *Attorney, Agent, or Firm*—Lyon & Harr, LLP; Mark A. Watson

(57) ABSTRACT

A "Panoramic Viewfinder" provides an intuitive interactive viewfinder display which operates on a digital camera display screen. This interactive viewfinder provides real-time assistance in capturing images for constructing panoramic image mosaics. The Panoramic Viewfinder "brushes" a panorama from images captured in any order, while providing visual feedback to the user for ensuring that desired scene elements will appear in the final panorama. This visual feedback presents real-time stitched previews of the panorama while capturing images. In one embodiment, the viewfinder display of the Panoramic Viewfinder includes a "mosaic preview" which presents a stitched mosaic preview of the captured images; a live display window representing a "current content" of the camera viewfinder, which is mapped to a matching location within the mosaic preview; and an optional panoramic "cropping frame" overlaid onto the mosaic preview which illustrates a section of the mosaic which will survive a rectangular cropping of the mosaic.

19 Claims, 10 Drawing Sheets
(6 of 10 Drawing Sheet(s) Filed in Color)

U.S. PATENT DOCUMENTS

| | | | |
|---|---|---|---|
| 6,392,658 | B1 | 5/2002 | Oura |
| 6,677,981 | B1 | 1/2004 | Mancuso |
| 6,686,955 | B1 | 2/2004 | Fields |
| 6,700,711 | B2 | 3/2004 | Nalwa |
| 6,891,561 | B1 * | 5/2005 | Achituv et al. .............. 348/36 |
| 7,162,102 | B2 * | 1/2007 | Cahill et al. .............. 382/288 |
| 2002/0140829 | A1 | 10/2002 | Colavin |
| 2004/0041906 | A1 | 3/2004 | Fruit |
| 2004/0189849 | A1 | 9/2004 | Hofer |
| 2004/0227825 | A1 * | 11/2004 | Sakimura et al. ............ 348/239 |
| 2006/0181619 | A1 * | 8/2006 | Liow et al. ................. 348/239 |

FOREIGN PATENT DOCUMENTS

| | | |
|---|---|---|
| EP | 1309171 | 5/2003 |

OTHER PUBLICATIONS

Szeliski, R., Video mosaics for virtual environments. IEEE Computer Graphics and Applications, 16(2):22-30. (1996).

Szeliski, R., and Shum, H. Creating full view panoramic image mosaics and environment maps. In Proc. of SIGGRAPH'97, pp. 251-258. 1997.

Teodosio, L. and Bender, W. (1993). Salient video stills: Content and context preserved. In Proc. ACM Multimedia '93, pp. 39-46.

Peleg, S., and Herman, J. Panoramic Mosaics by manifold projection. In Proc. of the 1997 Conference on Computer Vision and Pattern Recognition (CVPR '97) pp. 338. 1997.

Sawhney, H.S., Kumar, R., Gendel, G., Bergen, J., Dixon, D., Paragano, V. VideoBrush™: Experiences with consumer video mosaicing. In Proc. IEEE Workshop on Applications of Computer Vision (WACV), 1998: 56-62.

Irani, M. and Anandan, P. (1998). Video indexing based on mosaic representations. In Proc. IEEE, 86(5): 905-921.

Brown, M. and Lowe, D.G. Recognising Panoramas. In Proc. 9th International Conference on Computer Vision (ICCV2003), pp. 1218-1225. 2003.

Brown, M., Szeliski, R., and Winder, S. Multi-Scale Oriented Patches. Microsoft Technical Report MSR-TR-2004-133, Dec. 2004.

Agarwala, A. et al. Interactive digital photomontage. In Proc. Siggraph'04 ACM Transactions on Graphics 23(3):292-300. 2004.

Baudisch, P. Don't Click, Paint! Using Toggle Maps to Manipulate Sets of Toggle Switches. In Proceedings of UIST '98, San Francisco, pp. 65-66. 1998.

Tan, D.S., Gergle, D., Scupelli, P.G., Pausch, R. With Similar Visual Angles, Larger Displays Improve Performance on Spatial Tasks. In Proc. CHI 2003, pp. 217-224.

Zhu, Z., Hanson, A.R., Schultz, H., Stolle, F., Riseman, E.M. Stereo mosaics from a moving video camera for environmental monitoring. In Proc. Int. Workshop on Digital and Computational Video 1999, Tampa, Florida, pp. 45-54.

Yee, Ka-Ping. Peephole Displays: Pen Interaction on Spatially Aware Handheld Computers. In Proc CHI'03, pp. 1-8. 2003.

Baudisch, P., and Gutwin, C. Multiblending: displaying overlapping windows simultaneously without the drawbacks of alpha blending. In Proc. CHI 2004, Apr. 24-29, 2004.

Photovista panorama, http://www.myphotovista.com/photovista/features.html Date Unknown.

Photo Panaramas Made Easy, http://www.ulead.com/cool360/c360_benefit.pdf Date Unknown.

* cited by examiner

REAL-TIME PREVIEW FOR PANORAMIC IMAGES

BACKGROUND

1. Technical Field

The invention is related to construction of panoramic images, and in particular, to an image capture device, such as a digital still or video camera, which provides real-time interactive assistance to a user in capturing images used in constructing the panoramic images.

2. Related Art

In general, a mosaic panoramic image is an image that has been expanded in one or more dimensions by combining multiple overlapping image frames to generate the panorama. As a result, the panoramic image is typically larger than the size that a conventional image capture device (such as a digital still or video camera) is capable of capturing in a single image frame.

A number of conventional techniques have been developed to generate such panoramic images. For example, the basic approach is to simply take a plurality of regular photographic or video images in order to cover the entirety of the desired viewing space. These images are then aligned and composited into complete panoramic images using any of a number of conventional image "mosaicing" or "stitching" algorithms.

Early stitching schemes generally required a carefully controlled camera motion resulting in a known overlap between images. However, more recent stitching schemes have allowed users to take photos covering a random 2D field with pictures taken in an arbitrary order. In either case, as is well known to those skilled in the art, such systems generally take a set of images captured by the digital still or video camera and perform post-processing operations on those images, including, for example, aligning, compositing, deghosting, blending of overlapped areas, automatic adjustments of color, brightness, contrast, etc., to generate a mosaic image which is then typically cropped to a rectangular region or frame to create the final panoramic image.

However, one problem with such post processing of images is that the user never really knows for sure that sufficient coverage of the scene has been achieved to ensure that the desired panorama can be constructed from the set of captured image frames until the panorama has actually been generated at some later time. As a consequence it can be hard for users to see "the big picture."

In particular, using conventional image stitching schemes, it is not until the images are uploaded from the camera to the computing device (such as a PC-type computer, or the like) that users find that the resulting panorama is flawed. For example, gaps will occur in the panorama if users miss one or more spots. Gaps will also occur if the stitching program is unable to insert one or more of the captured images into the panorama, e.g., due to too little overlap between pictures, due to a lack of texture, due to problems with image focus (image too blurry), etc. Further, while gaps at the edge of a panorama can be removed by cropping the panorama, this may cause other desired image elements to be lost outside the cropping boundaries. In the worst case, what was intended to be a single panorama can end up as multiple unconnected (and odd-shaped) pieces of the overall image.

Another problem with conventional post-processing approaches involves the issue of "ghosting" where objects have moved from one frame to the next while the images for the panorama were being taken. While users may be able to identify flaws within a picture (e.g., out of focus) using the view finder, and retake it, flaws between photos, such as ghosting or differences in lighting etc. are less likely to be discovered while shooting. Unfortunately, by the time users notice such flaws, it is typically too late to retake the missing or flawed image frames.

Users can reduce the risk of flaws such as gaps and ghosting by using a larger overlap between images and by taking multiple copies of areas suspected of being subject to ghosting. This redundancy-based approach, however, is costly is terms of time and especially in terms of storage space (as more pictures are taken) and it still cannot guarantee successful generation of the resulting panoramic images.

At least one conventional scheme partially addresses some of these issues. For example, one conventional scheme, referred to as "VideoBrush™ " provides a near-real-time preview of a panoramic image constructed from images captured by a video camera. However, the VideoBrush™ system supports only translational motion, not full-view panoramas. In particular, the VideoBrush™ system provides techniques for 1 D and 2D video mosaicing using parametric alignment which includes videos captured with an approximately fixed camera location, or an arbitrarily moving camera capturing an approximately planar scene. Further, another problem with systems such as that offered by VideoBrush™ is that they do not provide explicit indications for issues such as whether desired scene elements will survive cropping to a conventional rectangular format, or whether the resulting panorama will be subject to ghosting.

Similarly, some digital consumer cameras offer a "stitch assist mode," or the like, in which the LCD (or other electronic display) shows the camera "viewfinder" and a part of the last frame taken for visual reference. For example, digital cameras such as the "Canon Powershot S230" provide an approximately 1D panoramic stitch assistance which requires the user to aim the camera, such that the viewfinder lines up with a reference image (typically the last image captured) displayed in a sub-region of the viewfinder. The latest frame then becomes the reference for the next shot, and so on. This approach guarantees successful stitching by ensuring the right amount of overlap. Also, the known spatial relationship between frames can simplify final post-hoc stitching of the images using a separate computing device.

Unfortunately, the approach offered by such cameras is limited in several ways. First, such approaches do not extend well to 2D panoramas. In particular, even if users could choose a connection direction between images as they move along, shooting a large 2D image by brushing back and forth in rows would only guarantee connectivity between predecessor and successor images, but not between the rows themselves. Second, such approaches offer no guarantee that the desired scene elements will survive cropping. Third, such approaches tend to limit the users' freedom, as the user is required to constantly focus on the LCD display of the camera. Further, issues such as ghosting and focus are not adequately addressed by such systems.

A similar system is provided by the "HP Photosmart R707" camera, which offers a stitch assist mode similar to that of the aforementioned "Canon Powershot S230," so taking panoramic pictures is subject to the same limitations. In addition, however, cameras such as the HP Photosmart R707 allow users to preview the entire panorama on the camera's LCD screen in playback. This allows users to see flaws while still on-site. Unfortunately, fixing such flaws still requires the user to retake the entire panorama, as images can not be inserted into the existing panorama to fix any identified flaws.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Panoramic Viewfinder," as described herein, provides an intuitive interface in the form of an interactive viewfinder display for capturing images to be used in the construction of panoramic mosaic images from a set of images of a scene. In general, the interactive viewfinder display of the Panoramic Viewfinder operates on the viewfinder display screen of a digital still or video camera, to provide real-time interactive assistance to a user in capturing images to be used in constructing panoramic images. More specifically, the Panoramic Viewfinder allows users to "brush" a panoramic image of a scene in any order, while providing visual feedback to the user so as to assist the user in ensuring that desired scene elements will appear in the final panoramic image.

In particular, the interactive viewfinder display of the Panoramic Viewfinder provides an interactive system for panorama construction that provides users with a stitched preview of the panorama while shooting images. A tested embodiment of the Panoramic Viewfinder provided a viewfinder display in an image capture device modified to included a unique collection of interface components that, in combination, allow users to capture exactly those pieces of a scene required to complete a desired panorama without the need to retake areas already covered (unless so desired). In general, these interface components included a "mosaic preview;" a live display window representing a "current content" of the camera viewfinder; and a panoramic "cropping frame" overlaid onto the mosaic preview.

The overall mosaic preview generally provides a preview of a stitched image that can be constructed from all images captured for a current panorama. This overall mosaic preview is not cropped to a rectangular area, but instead shows the full extents of the mosaic image that can be constructed from a set of images already captured by the camera. In various embodiments, sections of this mosaic preview image are highlighted, or otherwise modified to alert the user to potential problems in the mosaic, such as, for example, ghosting, focus problems, or gaps in the mosaic that would be evident in the final panoramic image. Further, in additional embodiments, as the mosaic preview image becomes increasingly large, relative to the size of a single image frame, the mosaic preview image can be scaled, panned, or zoomed, relative to the current content display window of the viewfinder display.

The "current content" display window is basically a dynamic sub-region of the overall camera display window. In general, the current display window is a live window which represents a display of whatever image is to be captured next, similar to the LCD "viewfinder" display of a conventional digital camera. However, unlike the viewfinder display of a conventional digital camera, this live current content window is dynamic in the sense that it is automatically mapped to a matching position within the overall mosaic preview image. As a result, the user can immediately see where a current image will fit into the existing overall mosaic. Further, because the current content of the viewfinder is displayed within this live dynamic window, it provides users with a reference system and helps them direct the camera to uncovered areas of the desired panorama. It should also be noted that in various embodiments, either or both the "mosaic preview" and the "current content" window can be scaled to better fit within the overall viewfinder display window of the digital camera.

Finally, the aforementioned panoramic "cropping frame" is simply a rectangular region that is highlighted within the "mosaic preview." In general, this cropping frame indicates the content that will result from a rectangular cropping of the mosaiced image. Consequently, this cropping frame shows users which scene elements will make it into the final image after it is cropped to rectangular shape. Further, this cropping frame is dynamic in the sense that it automatically moves, scales, and adjusts (in both the X- and Y-axes) to the largest possible rectangular size that can be cropped from the existing mosaic preview image.

In view of the above summary, it is clear that the Panoramic Viewfinder described herein provides a unique system and method for using a digital camera to generate mosaiced panoramic images of a scene. In addition to the just described benefits, other advantages of the Panoramic Viewfinder will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee.

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
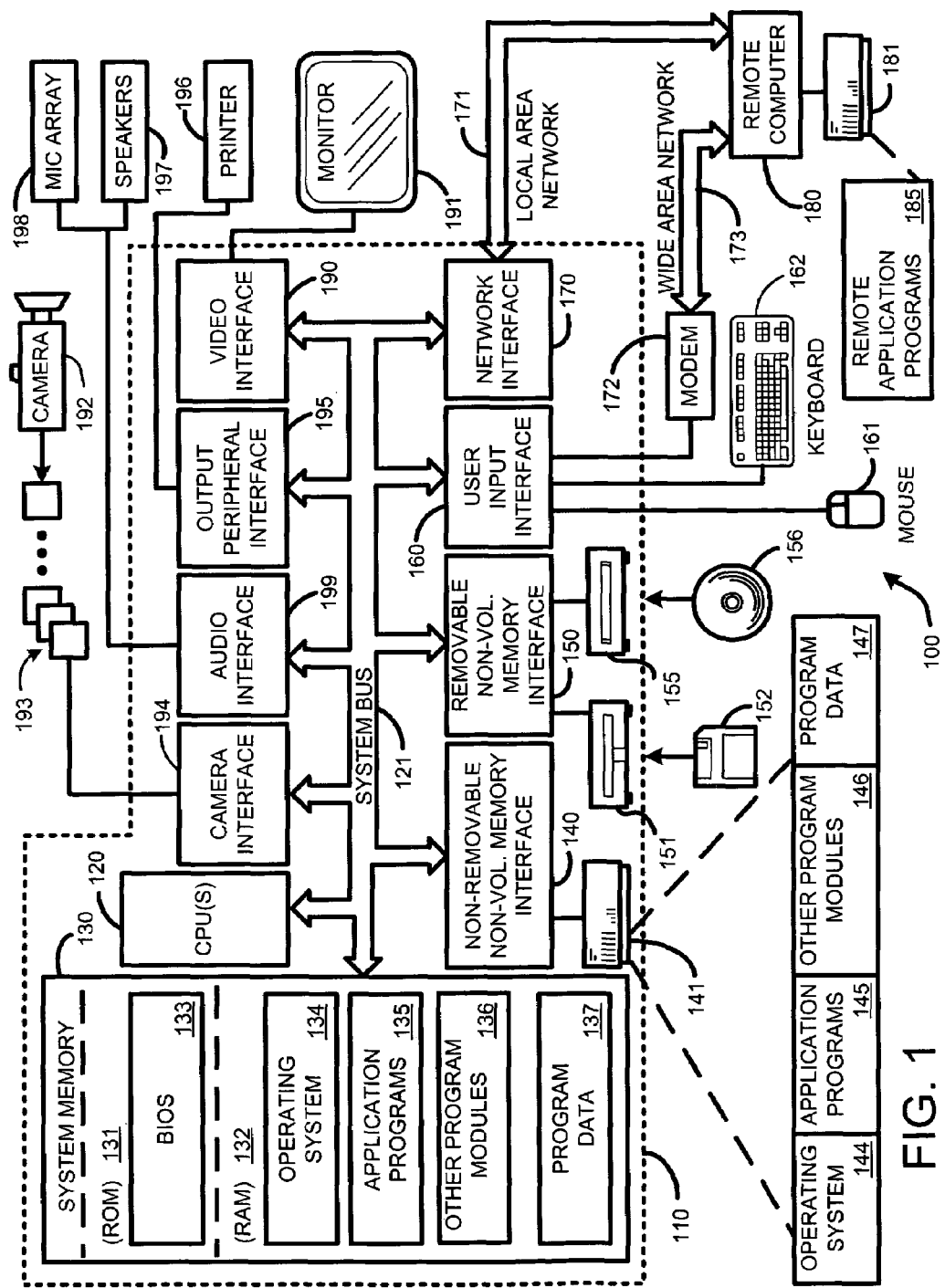
FIG. 1 is a general system diagram depicting a general-purpose computing device constituting an exemplary system for implementing a Panoramic Viewfinder, as described herein.
Figure 2:
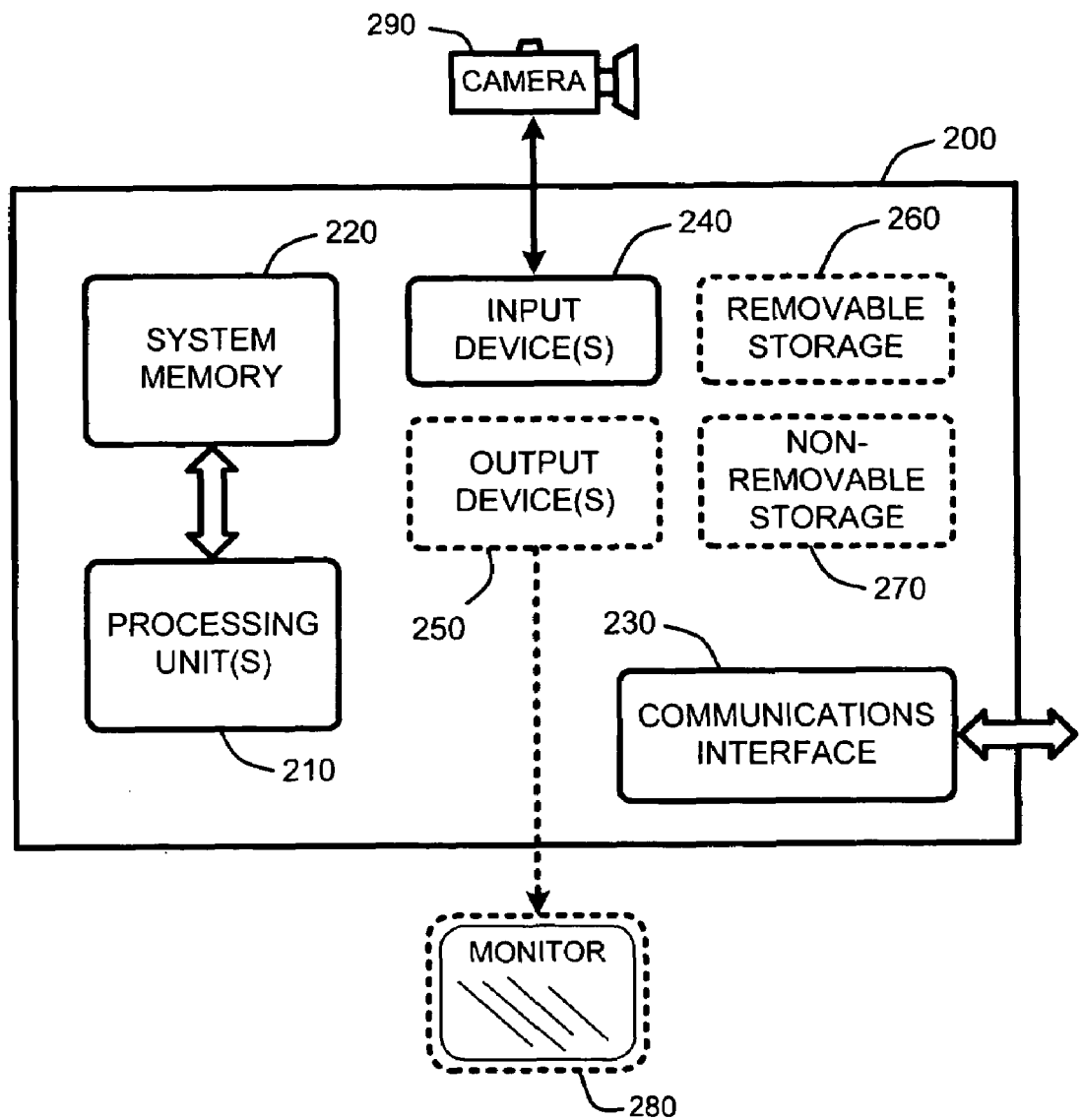
FIG. 2 is a general system diagram depicting a general computing device having simplified computing and I/O capabilities for use with a digital camera or other image input source for implementing a Panoramic Viewfinder, as described herein.
Figure 3:
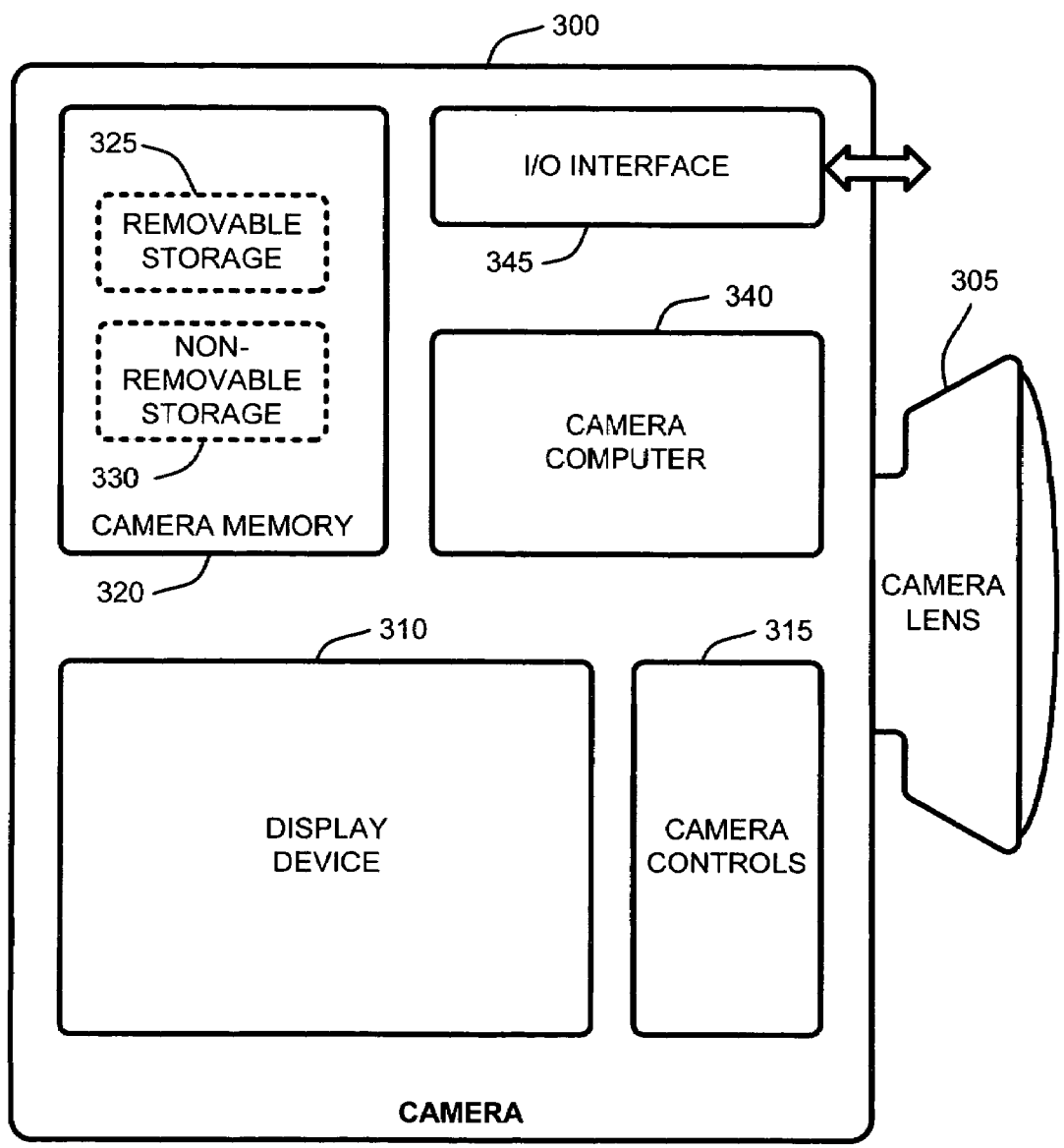
FIG. 3 is a general system diagram depicting a digital camera having integrated computing and I/O capabilities and an integral display screen for implementing a Panoramic Viewfinder, as described herein.

1.0 Exemplary Operating Environments:

FIG. 1, FIG. 2, and FIG. 3 illustrate various examples of suitable computing environments on which various embodiments and elements of a "Panoramic Viewfinder," as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device coupled to a digital camera. Such computing devices can typically be found in devices having at least some minimum computational capability in combination with a communications interface. Examples of well known simplified computing systems, environments, and/or configurations that may be suitable for use with the invention include, but are not limited to, hand-held, laptop or mobile computers, communications devices such as cell phones and PDA's, etc.

It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a computing device to implement the "Panoramic Viewfinder" (as described in further detail below), the computing device 200 must have some minimum computational capability and a wired or wireless interface 240 for connecting a digital camera 290 or other image input source.

In particular, as illustrated by FIG. 2, the computational capability of the computing device 200 is generally illustrated by processing unit(s) 210 (roughly analogous to processing units 120 described above with respect to FIG. 1), and system memory 220. Note that in contrast to the processing unit(s) 120 of the general computing device of FIG. 1, the processing unit(s) 210 illustrated in FIG. 2 may be specialized (and inexpensive) microprocessors, such as a DSP, a VLIW processor, or other micro-controller rather than the general-purpose processor unit of a PC-type computer or the like, as described above.

In addition, the simplified computing device 200 of FIG. 2 may also include other components, such as, for example connections for one or more input devices 240 (analogous to the input devices described with respect to FIG. 1. The simplified computing device of FIG. 2 may also include other optional components, such as, for example one or more output devices 250 (analogous to the output devices described with respect to FIG. 1), such as an external display device 280. Finally, the simplified computing device of FIG. 2 may also include removable and/or non-removable storage, 260 and 270, respectively (analogous to the storage devices described with respect to FIG. 1).

Finally, with respect to FIG. 3, this figure is a general system diagram depicting a digital camera 300 having integrated computing 340 and I/O capabilities 345, and a display device 310, such as an LCD screen, for implementing a Panoramic Viewfinder, as described herein.

In general, as is well known to those skilled in the art, conventional digital cameras include components such as those described above (e.g., I/O, computing, and display), in addition to camera memory 320 that is either removable 325 or non-removable 330. Such cameras also include a lens 305 and a set of one or more controls 315. Further, as with the simplified computing device described with respect to FIG. 2, the computing capability 340 of the digital camera can be implemented using low cost specialized processors, such as a DSP, a VLIW processor, or other micro-controller rather than the general-purpose processor unit of a PC-type computer or the like, as described above with respect to FIG. 1. As described in further detail below, these components are used in combination to enable the functionality of the Panoramic Viewfinder in a standalone digital camera.

The exemplary operating environments having now been discussed, the remaining part of this description will be devoted to a discussion of the program modules and processes embodying the "Panoramic Viewfinder."

2.0 Introduction:

A "Panoramic Viewfinder," as described herein, provides an intuitive interface in the form of an interactive viewfinder display for capturing images to be used in the construction of panoramic mosaic images from a set of images of a scene. In general, the interactive viewfinder display of the Panoramic Viewfinder operates on the viewfinder display screen of a digital still or video camera (or image capture device), to provide real-time interactive assistance to a user in capturing images to be used in constructing panoramic images.

Further, in additional embodiments, the interactive viewfinder display of the Panoramic Viewfinder is implemented on an external display device, either coupled directly to the digital camera, or coupled to the digital camera via a separate computing device. However, in each of these cases, the Panoramic Viewfinder described herein operates in essentially the same way. Consequently, while the Panoramic Viewfinder will be generally described herein as being implemented within a digital camera, it should be understood the detailed description of the Panoramic Viewfinder provided herein applies equally to the additional embodiments involving external display devices and/or external computing devices.

2.1 System Overview:

As noted above, the Panoramic Viewfinder described herein provides an intuitive interface in the form of an interactive viewfinder display for capturing images to be used in the construction of panoramic mosaic images from a set of images of a scene.

In general, the Panoramic Viewfinder allows users to "brush" a panoramic image of a scene in any order, while providing visual feedback to the user so as to assist the user in ensuring that desired scene elements will appear in the final panoramic image. This visual feedback is provided by presenting the user with a real-time stitched preview of the panorama while shooting images of the scene that will be used to construct the panorama. The viewfinder display provided by the Panoramic Viewfinder provides a unique capability to image capture devices that enable users to capture exactly those pieces of a scene required to complete a desired panorama without the need to retake areas already covered (unless so desired).

The interface components embodied in the Panoramic Viewfinder include a "mosaic preview" which presents a stitched mosaic preview of the captured images; a live display window representing a "current content" of the camera viewfinder, which is mapped to a matching location within the mosaic preview; and an optional panoramic "cropping frame" or "cropping box" overlaid onto the mosaic preview which illustrates a section of the mosaic which will survive a rectangular cropping of the mosaic.

In general, the overall mosaic preview generally provides a preview of a stitched image that can be constructed from all images captured for a current panorama. This overall mosaic preview is not cropped to a rectangular area, but instead shows the full extents of the mosaic image that can be constructed from a set of images already captured by the camera.

More specifically, the mosaic preview is a live, real-time, preview of the mosaic that can be constructed from the images captured by the user while the user is shooting the panorama. As implemented in a digital camera, the built-in LCD screen of the camera will show a preview of the panorama in its current state of completion. The preview is generated by compiling photo or video footage into a single panoramic picture on-the-fly as the user shoots those images (See Section 3.3 for more detail regarding stitching of the images).

In various embodiments, sections of this mosaic preview image are highlighted, or otherwise modified to alert the user to potential problems in the mosaic, such as, for example, ghosting, focus problems, or gaps in the mosaic that would be evident in the final panoramic image. Further, in additional embodiments, as the mosaic preview image becomes increasingly large, relative to the size of a single image frame, the mosaic preview image can be scaled, panned, or zoomed, relative to the current content display window of the viewfinder display so as to allow the user to see the mosaic preview along with the current content display window of the viewfinder.

The aforementioned "current content" display window is basically a dynamic sub-region of the overall camera display screen. In general, the current display window is a live window which represents a display of whatever image is to be captured next, similar to the LCD "viewfinder" display of a conventional digital camera. However, unlike the viewfinder display of a conventional digital camera, this live current content window is dynamic in the sense that it is automatically mapped to a matching position within the overall mosaic preview image. As a result, the user can immediately see where a current image will fit into the existing overall mosaic. In one embodiment, described in further detail in Section 3, the current content window is highlighted relative to mosaic preview so that it is more immediately apparent to the user where a new image will fit into the existing mosaic.

Further, because the current content of the viewfinder is displayed within this live dynamic window, it provides users with a reference system that helps them direct the camera to uncovered areas of the desired panorama. It should also be noted that in various embodiments, the "current content" window is scaled along with the mosaic preview to better fit within the overall display of the digital camera.

Finally, the aforementioned panoramic "cropping frame" is simply a rectangular region that is highlighted within the "mosaic preview." In general, this cropping frame simply indicates the content that will result from a rectangular cropping of the mosaiced image. In particular, as is well known to those skilled in the art, due to potential misalignment between the individual image segments as well as due to distortions performed during conventional image stitching, raw panoramas tend to be "fringy." Consequently, in order to obtain fringeless rectangular output images, in one embodiment, the Panoramic Viewfinder automatically crops panoramas to a largest possible rectangular area that is covered with images (or image segments). A preview of the content of this rectangular region is illustrated to the user by the cropping frame.

In general, the cropping frame shows users which scene elements will make it into the final image after it is cropped to rectangular shape. Further, this cropping frame is dynamic in the sense that it automatically moves, scales, and adjusts (in both the X- and Y-axes) to the largest possible rectangular size that can be cropped from the existing mosaic preview image. It should be noted that because the cropping frame is dynamic, this means that the cropping-frame is not under direct user control. Instead, users control the cropping frame indirectly through the image material they shoot. One advantage of this feature is that the user experience in constructing panoramic images is improved through a substantially less complicated user interface.

Figure 4:
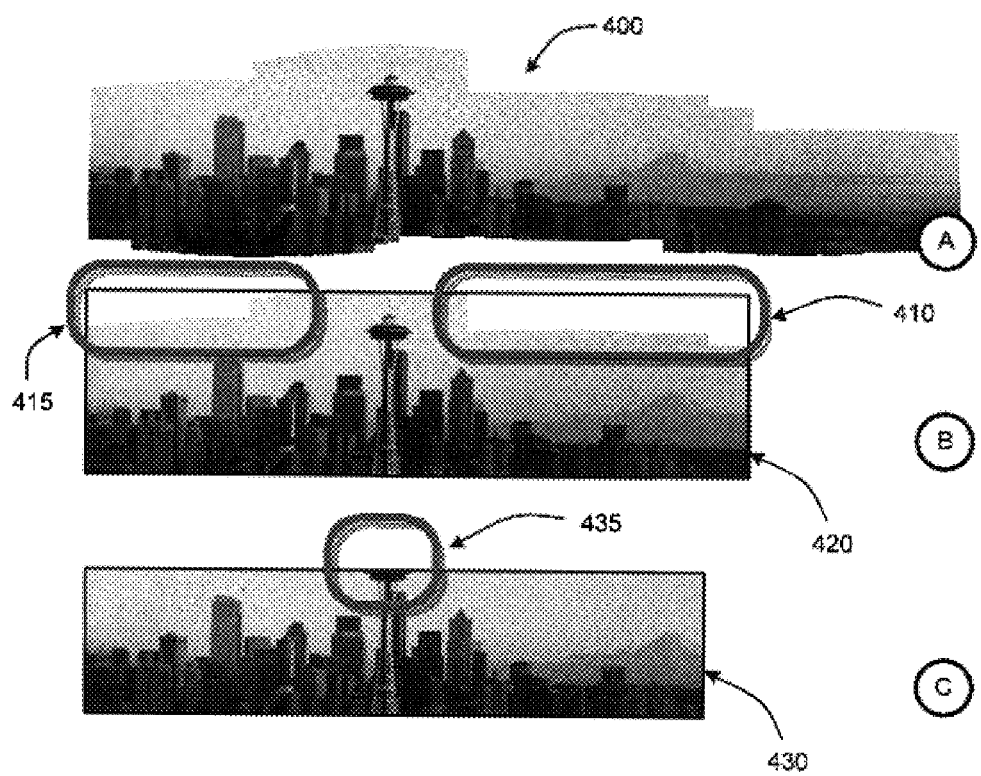
FIG. 4 is a sequence of three pictures illustrating: A) a stitched mosaic of a set of images of the downtown Seattle, Wash. skyline; B) gaps in a rectangular cropping of the stitched mosaic; and C) a final cropped panoramic image showing the loss of desired content (the top of the Seattle "Space Needle" is cropped) due to the gaps in the stitched mosaic.

For example, FIG. 4 is provides a sequence of three pictures illustrating: A) a stitched mosaic 400 of a set of images of the downtown Seattle, Wash. skyline; B) gaps 410 and 415 in a rectangular cropping 420 of the stitched mosaic; and C) a final cropped panoramic image 430 showing the loss of desired content 430 (the top of the Seattle "Space Needle" is cropped) due to the gaps in the stitched mosaic. This is a typical result achieved when the user is not provided with guidance as to what the final panorama will contain while the user still has an opportunity to capture additional images. In particular, when using the cropping frame as an overlay on the real-time mosaic preview, the user can see immediately that information (such as the top of the "Space Needle") will be lost following a rectangular cropping of the mosaic. Consequently, the user has the opportunity to fill in the gaps in the mosaic (by simply capturing additional images) that are illustrated by the cropping frame, so as to avoid such losses of desired image content.

In another embodiment, areas of the mosaic preview outside of the cropping frame are de-emphasized (such as, for example, by decreasing the brightness of the areas outside of the cropping frame). This de-emphasis of selected portions of the mosaic preview is useful for highlighting the portions of the mosaic preview image that will remain after a rectangular cropping of the final mosaic image.

In a tested embodiment of the Panoramic Viewfinder, user interaction with the Panoramic Viewfinder was designed to operate in a manner consistent with the normal use of conventional digital camera. For example, in one embodiment of the Panoramic Viewfinder, the user starts out in the camera's normal photo mode by taking a first image, the camera LCD shows what the viewfinder sees, and that image is captured as soon as the user presses the shutter button. Next, once the user decides to include additional scene elements in the form of a panorama, the user selects a "panorama mode" or the like, by using camera controls. Once this panorama mode is selected, any additional images that are captured are automatically included in the mosaic preview. Note that in various embodiments, additional images are either captured manually as the user takes individual photographs, or automatically as the user pans the camera across the scene.

One advantage of the Panoramic Viewfinder described herein is the ease with which users can capture the images used to construct image mosaics. For instance, to expand on the example provided above, one simple strategy for using a tested embodiment of the Panoramic Viewfinder to construct panoramic images that was observed to be particularly effective began with the user simply manually capturing images of any "landmarks" (or other scene elements) at or near the boundaries that are desired for the overall panorama. These landmarks are captured in exactly the same manner as taking normal pictures of individual elements. Then, simply capturing additional images between these boundary landmarks will act to eventually connect all of the landmarks into a single panorama.

Further, because of the aforementioned cropping frame, the resulting mosaic preview provides a frame of reference which enables the user to easily fill in missing regions of the mosaic by simply capturing additional images while moving the camera across "black" or empty regions of the mosaic preview image located between the landmarks. The edges of the final panorama (relative to the cropping frame) can be touched up (by simply capturing additional images along the boundaries illustrated by the cropping frame) until all desired scene elements are contained within the cropping frame. Finally, expansion of the panorama is easily accomplished by simply including additional "landmarks" and filling in any empty space as described above.

Note that as described in further detail in Section 3, there are several further embodiments related to the capture of additional images while in panorama mode. For example, in one embodiment, additional images are only captured when the user presses the camera shutter button. In another embodiment, images are captured automatically as the user pans the camera around the scene. This automatic capture can operate either at a predetermined frame rate, or as a function of the amount of new material (and overlap) in the current content display window (relative to the existing mosaic preview). Alternately, in the case of a video camera, the images are typically captured automatically, at a given frame rate, with those images then being used to generate the mosaic preview. However, in various embodiments, such video cameras can also capture images as a function of the amount of new material (and overlap) in the current content display window (relative to the existing mosaic preview).

The above described features of the Panoramic Viewfinder offer a number of advantages over conventional digital cameras, including those cameras offering a "stitch assist mode," or the like.

For example, one advantage of the Panoramic Viewfinder is that by providing clear visual feedback for successful panorama completion (desired scene elements in cropping frame) the Panoramic Viewfinder allows users to get guaranteed results. The cropping frame solves the dilemma faced by post-hoc cropping. Without the cropping frame, users often see themselves faced with having to make tradeoffs between a panorama that shows all desired scene elements and one that is fringeless. The reason is that without the cropping frame, panoramas offer the wrong affordance: specifically, the panorama will typically appear to the user to be bigger than it actually will be (once cropped), causing users to stop capturing images too early. The cropping frame repairs this broken affordance, as it shows users exactly what they will really get once the image is cropped. Thus, the Panoramic Viewfinder shows users exactly what they need to do in order to get the desired output.

Another advantage of the Panoramic Viewfinder is that the real-time preview of the image mosaic makes flaws, such as ghosting or frames that cannot be stitched, visible as they happen. This allows users to retake these areas, thereby eliminating those problems from the mosaic.

Yet another advantage of the Panoramic Viewfinder is that it helps to user to maximize the use of their time spent in capturing images for the panorama, while minimizing the user's effort. Specifically, the mosaic preview allows users to avoid areas already covered. Further, the mosaic preview also helps users avoid taking unnecessary image material, i.e., material located outside the space spanned by the landmarks. In addition, the cropping frame allows users to stop when done, instead of taking additional images, just in case what they have is not quite sufficient to construct the desired panorama. The cropping frame also supports shooting in a shape minimizing waste (rectangle). This is especially useful for shooting long thin pans. Without support (such as a tripod or other camera mount), these types of camera pans tend to produce image mosaics that are slightly slanted or curved, which will eliminate large parts of the panorama during any rectangular cropping.

Another advantage of the Panoramic Viewfinder is that it helps to minimize storage space requirements, allowing users to take more and larger panoramas with a given amount of storage. One reason is that taking unnecessary image material is avoided because the user can see in real-time exactly what the final panorama will contain. In addition, in one embodiment, providing sufficient computing power for the digital camera (either internally, or via an externally connected computing device) allows for final, or semi-final, stitching and cropping in near-real-time, thereby allowing the camera to automatically discard more space-intensive raw image material. However, while this feature allows the users to capture larger panoramas by minimizing storage requirements, users will often want to keep a subset of the original frames for later processing. In this case, the automatic discarding of image material is not enabled.

Finally, yet another advantage offered by the Panoramic Viewfinder is that by giving users a final result right away, the Panoramic Viewfinder offers "instant gratification" to the user. This instant gratification is among the prime reasons why typical users generally prefer digital photography to traditional photography (which requires development of the cameras film and subsequent processing of that film to produce images). This way, the Panoramic Viewfinder makes the user experience while shooting panoramas comparable to the experience of shooting a regular photo.

Figure 5:
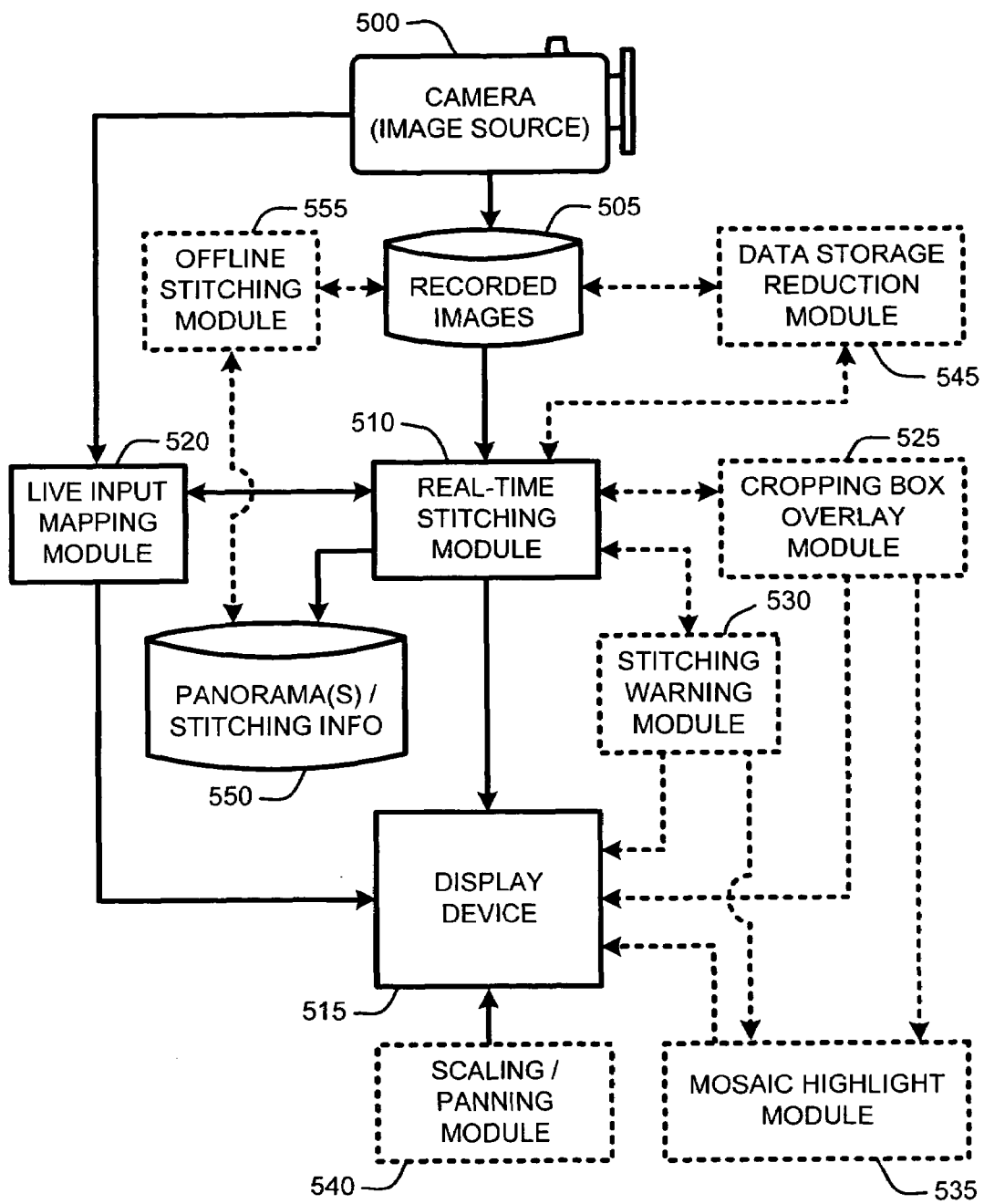
FIG. 5 illustrates an exemplary architectural system diagram showing exemplary program modules for implementing a Panoramic Viewfinder, as described herein.

2.2 System Architectural Overview:

The processes summarized above are illustrated by the general system diagram of FIG. 5. In particular, the system diagram of FIG. 5 illustrates the interrelationships between program modules for implementing the Panoramic Viewfinder, as described herein. It should be noted that any boxes and interconnections between boxes that are represented by broken or dashed lines in FIG. 5 represent alternate embodiments of the Panoramic Viewfinder described herein, and that any or all of these alternate embodiments, as described below, may be used in combination with other alternate embodiments that are described throughout this document. Further, it should also be noted that for purposes of clarity of explanation, the Panoramic Viewfinder illustrated in FIG. 5 shows a camera or image source 500 as being external to the overall system of the Panoramic Viewfinder. However, as noted above, in various embodiments, some or all of the components and program modules illustrated in FIG. 5 are integral to the camera 500.

In general, as illustrated by FIG. 5, the Panoramic Viewfinder generally operates by providing recorded images 505 from a digital camera or other image source 500 to a real-time stitching module 510. The real-time stitching module 510 acts in real-time to generate a mosaic preview image which represents a stitching of the recorded images 505 captured for the desired panoramic image. As described in further detail herein, this mosaic preview image grows over time as more images are captured and stitched together by the real-time stitching module 510. This mosaic preview image is then displayed, in real-time, on a display device 515 (such as, for example, the integral LCD display of a digital camera 500).

In addition, a live input mapping module 520 analyzes the input from the camera 500 (i.e., the view through the lens of the camera to the viewfinder of the camera) and, in combination with the real-time stitching module 510, maps that input to a corresponding location on the display device 515 relative to the overall mosaic preview image being displayed on the display device. Note that this mapping of the live or "current content" of the camera viewfinder occurs in real-time without actually needing to capture an image for storage. As a result, the user can immediately see where the next picture that will be taken will fit into the overall mosaic preview image without actually taking that picture. This feature allows the user to easily capture those scene elements that are desired for the final panoramic image. Further, to make viewing and recognition of the current content window of the camera viewfinder more visible, in a tested embodiment, the current content window was further highlighted by surrounding it with a clearly visible border.

As noted above, in one embodiment, a "cropping box" is used to indicate to the user what portion of the mosaic preview image will survive a rectangular cropping. In general, this cropping box is generated by a cropping box overlay module 525 which analyzes the output of the real-time stitching module 510 to determine the extents of the largest rectangle that can drawn over the mosaic preview image without having gaps (missing image information) along any border of the mosaic preview image. Once computed, the cropping box is simply displayed as an overlay on the mosaic preview image.

In a related embodiment, a mosaic highlight module 535 is used to either emphasize the area within the cropping box, or to de-emphasize the area outside of the cropping box, so that the area that will survive cropping is even more readily apparent to the user. One example of de-emphasis of the area outside of the cropping box is to simply reduce the brightness of areas of the mosaic preview outside of the cropping box relative to the areas within the cropping box. Similarly, in a closely related embodiment, any portion of the current content window of the camera viewfinder that falls outside of the current cropping box extents is also de-emphasized so that the user can immediately see the contribution that a current view will add to the overall panorama.

In another embodiment, a stitching warning module 530 is provided to alert the user to problems with the real-time stitching of recorded images (or mapping of the live input from the camera 500). For example, as described in further detail in Section 3, it is possible for any image stitching technique to lose track of where an image (including either the recorded images 505, or the live input from the camera 500) should fit into an overall mosaic. Causes for such failures can include, but are not limited to, insufficient image detail or texture for accurate mapping (such as a clear blue sky with no included landmarks). Other possible problems that can be identified by the stitching warning module include issues such as detection of ghosting effects within the mosaic preview, gaps within the interior boundaries of the cropping box, problems of image focus for one or more images, etc.

In the event any such problems are identified by the stitching warning module 530, an alert is provided on the display device 515 to draw the attention of the user to the specific problem while there is still time to fix the problem. Typically, the solution for fixing any particular problem is to retake one or more images covering the areas of the mosaic preview where the problems have been identified. Further, in the event that the real-time stitching module 510 loses track of where an image should fit into an overall mosaic preview, the stitching warning module 530 will suggest that the user move the camera to an area that has already been captured and successfully stitched, and then to retake additional images moving out from that area back towards the area where tracking was lost.

In the case where texture is a problem, such as the clear blue sky example, the stitching warning module can also suggest that the user zoom out to capture a wider field of view containing the low-texture region in addition to some already mapped landmarks. It should be noted that the real-time stitching module is capable of scaling (and warping, if necessary) the input images to map them to the mosaic preview image, even in the case of different zoom levels between images.

In a related embodiment, the stitching warning module 530 acts in cooperation with the mosaic highlight module 535 to highlight or otherwise emphasize particular problem areas within the mosaic preview image.

As noted above, the mosaic preview image grows over time as more images are captured and stitched together by the real-time stitching module 510. Consequently, in one embodiment, a scaling/panning module 540 scales the extents of the mosaic preview image so that the entire mosaic preview image will fit into the extents of the display device 515. However, because the live input mapping module 520 maps the input from the camera 500 to the corresponding location relative to the overall mosaic preview image, the view of that live input (i.e., the current content window) is also scaled. Consequently, over time, as the mosaic preview grows, the current content window can shrink to the point where it is difficult for the user to see the content within that window. Therefore, in another related embodiment, the current content window will not be scaled below a minimum size, but will instead overlay the area of the mosaic preview where the image would be stitched, if it is captured (see Section 3.4 for additional discussion of this point).

In another related embodiment, rather then uniformly scaling the entire mosaic preview (and the current content window), the scaling/panning module 540 scales and/or warps portions of the mosaic preview to compress the edges of the mosaic preview while keeping the current content window larger, and approximately near the center of the display device 515, within some tolerance. Similarly, in another embodiment, the scaling/panning module 540 provides panning of the mosaic preview to allow portions of the mosaic preview to go "off screen" while keeping the current display window on-screen to avoid shrinking the mosaic preview (and the current content window) to a point where it is hard to see sufficient detail in either the mosaic preview or the current content window.

Note that the features described above with respect to the scaling/panning module 540 are typically more important with display screens that are integral to digital cameras as such screens are typically limited in both size and resolution.

In yet another embodiment of the Panoramic Viewfinder, a data storage reduction module 545 is used to automatically eliminate redundant image information from the recorded images 505. For example, in capturing images for a mosaic, there will naturally be some degree of overlap between the images. Therefore, in one embodiment, following stitching by the real-time stitching module 510, the data storage reduction module 545 will automatically delete some or all of any redundant image information from the recorded image data 505.

One advantage of the embodiments enabled by the data storage reduction module is that when using a relatively limited image storage space, such as the internal memory of a digital camera, additional space becomes available for capturing larger panoramic image mosaics. Conversely, one disadvantage to this embodiment is that some or all of the individual images will no longer be complete (rectangular) images for use by themselves. Note that in various embodiments, the data storage reduction module 545 can be manually enabled or disabled by the user, or can be automatically enabled as a function of remaining storage space within the digital camera 500.

Once all images desired for a particular panorama have been stitched by the real-time stitching module 510, and optionally cropped to image extents corresponding to the cropping box provided by the cropping box overlay module 525, the resulting panoramas are stored to a file or database of panoramic images 550 for later use, as desired.

However, in another embodiment, the real-time stitching module 510 only performs a preliminary stitching to generate a "preview only" version of the mosaic for display on the display device 515. In this embodiment, the basic relational information between images, such as image mapping, warping, and scaling information, which will be used in computing the final stitching of the recorded images 505, is stored 550 in place of a final panoramic image mosaic. Then, this stored information 550 is used in a non-real-time offline stitching of the recorded images by an offline stitching module 555.

One advantage of the embodiment offered by the offline stitching module 550 is that final image stitching, including conventional blending, feathering, contrast and brightness adjustments, de-ghosting operations, etc., can be computationally expensive, and thus difficult to implement within the relatively limited computing power offered by a typical digital camera. However, preliminary low-resolution stitching, to generate a simple preview of the final image mosaic is computationally less expensive, thereby offering better performance in the case of limited computing power. Another advantage of the embodiment by the offline stitching module is that storage of a final stitched version of the completed panorama can require a significant amount of storage space, approaching, in the limit, the sum of the storage space for each individual image used in constructing the final panorama. However, storage of the relational information between the images for use in offline construction of a final panorama takes relatively very little space in comparison to an actual panoramic image. Consequently, this embodiment is also useful where camera memory is limited.

3.0 Operation Overview:

The above-described program modules are employed for implementing the Panoramic Viewfinder described herein. As summarized above, this Panoramic Viewfinder provides an intuitive interface in the form of an interactive viewfinder display for capturing images to be used in the construction of panoramic mosaic images from a set of images of a scene. The following sections provide a detailed discussion of the operation of the Panoramic Viewfinder, and of exemplary methods for implementing the program modules described in Section 2.

3.1 Operational Details of the Panoramic Viewfinder:

The following paragraphs detail specific operational embodiments of the Panoramic Viewfinder described herein. In particular, the following paragraphs describe cameras and input images for use with the Panoramic Viewfinder; general construction of image mosaics using conventional stitching techniques; elements of the Panoramic Viewfinder user interface; user interaction with the Panoramic Viewfinder; and additional embodiments of the Panoramic Viewfinder.

3.2 Cameras and Image or Video Streams:

As noted above, in one embodiment, the Panoramic Viewfinder is embodied within a digital still or video camera which has sufficient integrated computing power to generate real-time mosaic previews, map current viewfinder content to the mosaic previews, and generate cropping frames to illustrate the maximum content that can survive a rectangular cropping of the image mosaic. However, in addition to implementing the Panoramic Viewfinder within a digital still or video camera, any of a number of conventional camera types or video feeds may be used in combination with the Panoramic Viewfinder.

In fact, virtually any digital camera or video stream feed which is capable of being interfaced with an external computing device, and by extension to the Panoramic Viewfinder, may be used. Further, many newer still or video cameras can be connected directly to a computer's existing ports (USB interfaces, IEEE 1394 interfaces, Bluetooth™ wireless interfaces, IEEE 802.11 wireless interfaces, etc). Any such camera can be used by the Panoramic Viewfinder.

Further, if the functionality of the Panoramic Viewfinder is not integral to that camera, the Panoramic Viewfinder can be instantiated on the display device of the attached computer in the same manner as if the Panoramic Viewfinder were being displayed on the LCD screen of a digital camera. For example, a user can use a conventional "web cam" or the like (having no integral computational capabilities), connected to a desktop, notebook, or handheld computing device, to generate panoramic images in basically the same manner as if captured by a dedicated digital camera having integrated Panoramic Viewfinder capabilities.

However, as noted above, rather than describe every possible combination of an external camera connected to a separate computing device for enabling the Panoramic Viewfinder, the Panoramic Viewfinder will be generally described herein as being implemented within a digital camera. However, it should be understood the detailed description of the Panoramic Viewfinder provided herein applies equally to the additional embodiments involving external display devices and/or external computing devices coupled to cameras which may or may not include integral display devices or computing capabilities.

3.3 Construction of Image Mosaics:

Generation of a mosaic from a set or cluster of similar or related image frames is a concept that is well known to those skilled in the art, and will be only generally described herein. In general, the basic idea of conventional mosaicing techniques is to obtain a wide field of view (FOV) or panoramic image of a scene given a set or sequence of spatially related image frames. This panorama is generally constructed by capturing images as a camera moves and then applying post-hoc stitching of the images to obtain a larger image.

For example, many digital cameras come bundled with software for automatic post-hoc construction of panoramic image mosaics from images acquired from the cameras (with the post-hoc processing being performed on a separate computing device). In general, the geometry of the mosaicing problem for digital cameras is well understood, and typically consists of estimating a relatively small camera matrix or homography for each image. This estimation process is typically initialized by roughly ordering the images, either automatically, or via user input. Typical mosaicing schemes frequently use either feature-based or direct methods.

Conventional feature-based methods typically begin by establishing correspondences between points, lines or other geometric entities detected in the image. For example, a typical feature-based approach would be to extract Harris corners and use a normalized cross-correlation of the local intensity values to match them.

Direct methods differ from feature-based methods in that the direct methods attempt to iteratively estimate the camera parameters by minimizing an error function based on the intensity difference in the area of overlap. Direct methods have the advantage that they use all of the available data and hence can provide very accurate registration. However, one disadvantage to such methods is that they depend on a 'brightness constancy' assumption which may not hold true. Further, such methods typically also require initialization.

In addition, many of these stitching techniques are capable of producing 360-degree panoramas, i.e. panoramas the left end of which is logically connected to the right end. Consequently, in one embodiment, whenever the stitching processes of the Panoramic Viewfinder determine that the panorama has wrapped, it modifies the appearance of the mosaic preview image to indicate that the panorama is in fact a continuous 360-degree image. In a tested embodiment, the mosaic preview was modified for 360-degree panoramas by marking the left and right edge of the display of the mosaic preview as symbolic zipper, indicating that the two ends are logically connected. Clearly, other markings, such as text, arrows, etc., may be used in various embodiments to indicate that the ends of the panorama are logically connected so as to form a 360-degree panorama.

Regardless of what methods are used to stitch images, once the features have been matched between the various images, the mosaic images are typically constructed using conventional blending, warping, and scaling techniques to provide smooth transitions between the images, even in the case where there are intensity changes between the images, while preserving sharp detail, even in the presence of small registration errors between the various images.

A number of these conventional stitching techniques are adaptable for use to generate real-time previews of a mosaic image without necessarily needing to generate a final stitched mosaic. Further, given sufficient computing power, a number of conventional stitching techniques are adaptable for use in generating final stitched versions of the mosaic image in real-time, or near-real-time. It should be noted that the mosaicing techniques summarized above are only a few of a very large number of conventional techniques, and that any of a large number of these conventional mosaicing techniques are capable of being adapted for use in either real-time and/or offline stitching (with a real-time preview version of the stitched mosaic) of captured images by the Panoramic Viewfinder described herein.

3.4 Panoramic Viewfinder User Interface:

As noted above, the user interface of the Panoramic Viewfinder generally includes a visual preview of the stitched mosaic (i.e., the "mosaic preview"), in the display or camera viewfinder screen, a live display window representing the "current content" of the camera viewfinder; and an optional panoramic "cropping frame" overlaid onto the mosaic preview. In addition, in various embodiments, the user interface of the Panoramic Viewfinder also includes various visual alerts, warnings, or instructions relating to particular problems identified in the stitched mosaic. Given that each of these elements (mosaic, current viewfinder display, cropping frame) may co-exist in a very constrained space (such as the small LCD screen of a digital camera), overlap, and change independent from each other, there is a risk of visual interference. Consequently, while complicated displays of these elements may be implemented, it has been observed that keeping the combination of these elements as simple as possible enhances the user experience when capturing images for the panoramic image mosaic.

Figure 6:
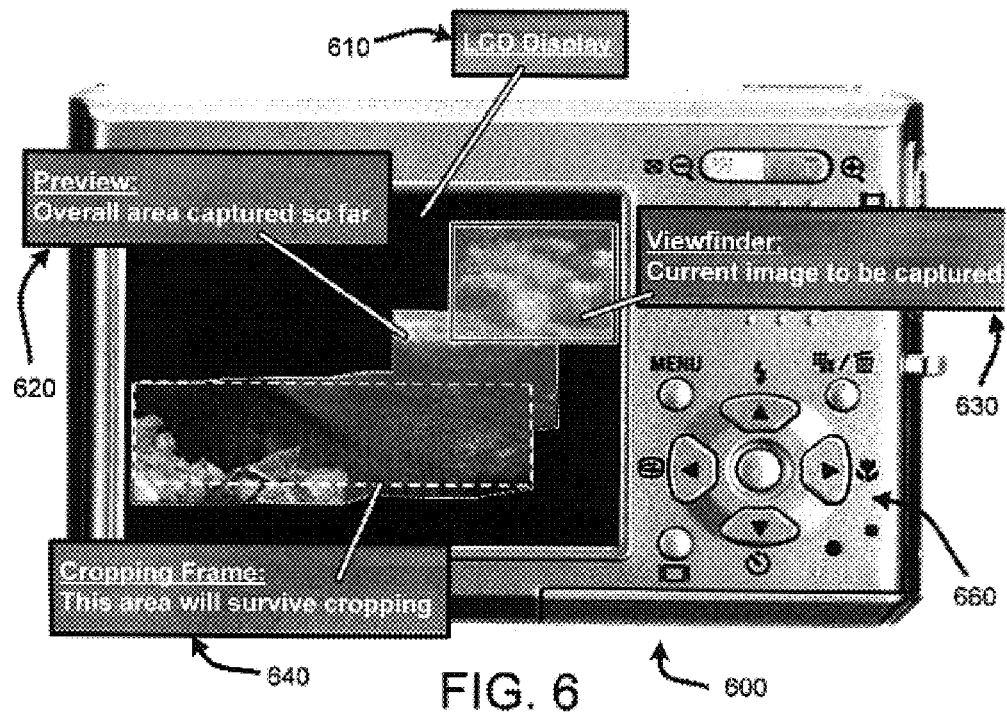
FIG. 6 illustrates an exemplary user interface embodied within a digital camera, wherein the user interface shows an integral LCD display, a "mosaic preview," a live display window representing a "current content" of the camera viewfinder, and an optional panoramic "cropping frame" for implementing a Panoramic Viewfinder, as described herein.
Figure 7:
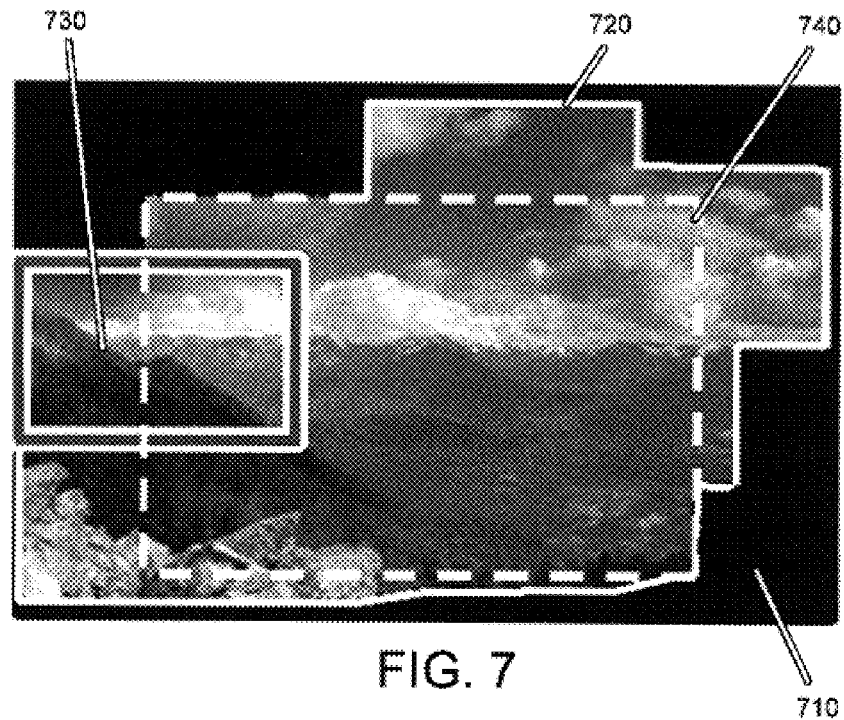
FIG. 7 illustrates a larger view of the LCD display of FIG. 6, showing the mosaic preview, the current content window of the camera viewfinder, and the panoramic cropping frame.

For example, as illustrated by FIG. 6, in one embodiment, the mosaic preview 620 is automatically scaled to fit the LCD display screen 610 of a digital camera 600. The live display window representing a "current content" (what the lens currently sees) of the camera viewfinder 630 is then mapped to the corresponding location within the mosaic preview 620. In addition, the cropping frame 640 is overlaid on top of the mosaic preview 640. The camera 600 may also include a set of conventional controls 660 for operating the camera in a conventional fashion, or for manually selecting particular options (such as shooting in the Panoramic Viewfinder mode described herein). FIG. 7 illustrates a larger view of the LCD display of FIG. 6 (with a different view of the scene shown in FIG. 6) showing the mosaic preview 720, the current content window 730 of the camera viewfinder, and the optional panoramic cropping frame 740.

Examples of the operation of these features (mosaic preview, current content window, and the cropping frame) are discussed in detail below in Section 3.4.3 and 3.4.4 with respect to FIG. 8 through FIG. 10B.

3.4.1 Camera Display Device:

As described herein, in one embodiment, the user interface of the Panoramic Viewfinder is implemented on the LCD screen of a digital still or video camera. Typically, such integral camera displays are LCD displays that are on the order of about 2.5 inches in size (diagonally), and have various resolution capabilities, depending upon the type of camera. However, in view of the discussion provided herein, it should be clear that the discussion of the camera display is also intended to encompass other external display devices that are either connected directly to the camera, or connected to the camera via an external computing device to which the camera is itself connected.

In one embodiment, a "bounding box" was included on the LCD display of the camera. The general purpose of the bounding box is to provide a region for the user to fill in by "brushing" the camera across some predefined area covering a scene of interest to the user. The mosaic preview is scaled relative to the bounding box, so that the entire scene will fit into the bounding box once all of the images have been stitched. However, while this bounding box is useful for some applications, it tends to distract the user by requiring the extra step of first defining the extents of the bounding box. Consequently, in another embodiment, the bounding box was not used. In fact, since the size of the LCD display screen is itself limited, it essentially acts as an implicit bounding box within which the mosaic preview is rendered.

In another embodiment, the background of the camera display screen may be rendered in different colors or patterns outside of the extents of the mosaic preview image. However, it has been observed that the use of a blank (or black) background outside of the extents of the mosaic preview image provides the simplest, and this most intuitive user interface.

3.4.2 Mosaic Preview Image:

As noted above, the Panoramic Viewfinder provides a real-time or near-real-time mosaic preview image on the camera display screen, as that mosaic image grows with the stitching of additional images into that mosaic preview as soon as the new image is added. In displaying the image mosaic on the display screen, the visual representation is designed to be as straightforward as possible so as to minimize visual distractions to the user.

In a tested embodiment, the mosaic preview was surrounded by a defined border, such as, for example, a solid white or colored line, to ensure a clear visual separation between the mosaic preview and other elements of the Panoramic Viewfinder, such as the cropping frame or the current content window, or simply unpopulated areas of the camera display screen.

Figure 11:
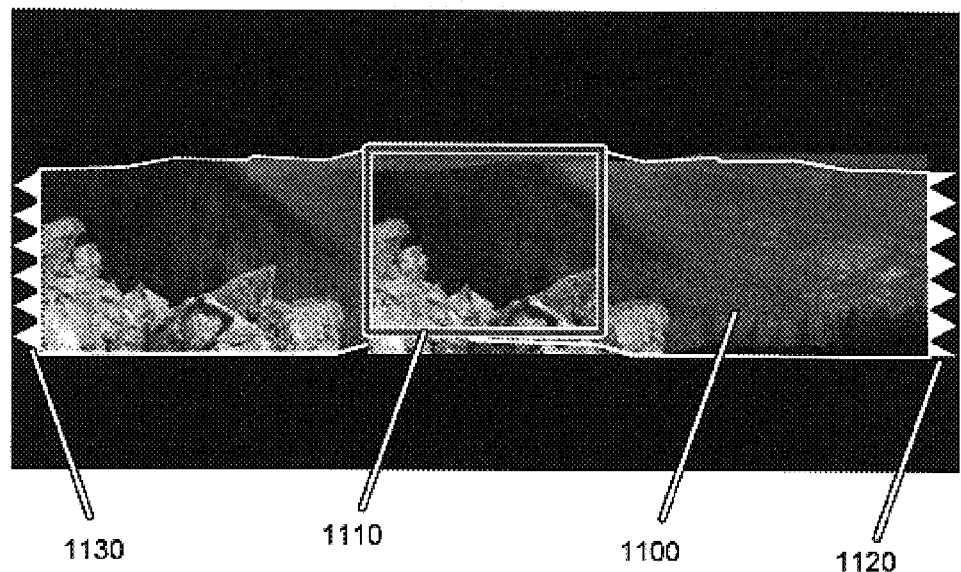
FIG. 11 illustrates generation of 360-degree cylindrical panoramic mosaic previews from a set of images of a scene.

Further, as indicated above, the Panoramic Viewfinder is capable of constructing 360-degree panoramic images. Thus, in one embodiment, as illustrated by FIG. 11, the Panoramic Viewfinder represents the existence of a 360-degree cylindrical panoramic mosaic 1100 by illustrating left and right symbolic zippers (1120 and 1130) on the left and right extents of the mosaic preview image. In this case, panning of the mosaic preview image is used such that the current content window 1100 showing the live input from the camera viewfinder remains approximately near the center of the camera display. Note that such symbolic zippers are only one of many ways that such 360-degree panoramas may be indicated. Other methods include the use of text, arrows, connecting lines, etc.

Further, as noted above, the mosaic preview image grows over time as more images are captured and stitched together to create the mosaic preview image displayed on the camera LCD screen. As a result of this image growth, it the mosaic preview image can quickly reach a point where it is too large to fit within the extents of the cameras' LCD display. Therefore, in one embodiment, as the mosaic preview image grows over time with the incorporation of additional images, the Panoramic Viewfinder acts to scale, warp, and/or pan the mosaic preview image.

For example, in one embodiment, the Panoramic Viewfinder scales the extents of the mosaic preview image (in one or more dimensions) so that the entire mosaic preview image will fit into the extents of the display device. This scaling is both automatic and dynamic in the sense that the scaling is applied, if necessary, whenever a new image is stitched into the mosaic preview. Further, as discussed in further detail below, the live input from the camera corresponding to the current content window is also scaled in various embodiments to match the scaling of the mosaic preview.

Specifically, given the importance of the camera viewfinder to the user (so that the user can actually see what they are capturing with the camera, the Panoramic Viewfinder provides various additional embodiments that allow users to increase the size of the current content window representing the camera viewfinder. In further embodiments, rather then uniformly scaling the entire mosaic preview, the Panoramic Viewfinder scales and/or warps portions of the mosaic preview to compress the edges of the mosaic preview. One of the advantages of such scaling is that it allows for the current content window of the camera viewfinder to be displayed in a larger window relative to the overall mosaic preview image.

For example, in one embodiment, a "fisheye mode" is used to provide a larger camera viewfinder window by shrinking some content outside of the viewfinder window to make additional space for a larger viewfinder. This distortion can be either linear, or non-linear. Further, in one embodiment, to ensure that users are left with visual aids required to fill in complete the desired portions of the image mosaic, a distortion that preserves horizontal and vertical lines is applied to those areas of the mosaic preview outside of the current content window of camera viewfinder. Specifically, portions of the mosaic preview image above and below the current content window of camera viewfinder are compressed vertically and the portions of the mosaic preview image to the left and right of the current content window of camera viewfinder are compressed horizontally.

In a related embodiment, an "overlay mode" is used to allow the current content window of camera viewfinder to fill the entire screen. In this embodiment, the mosaic preview is reduced to a line drawing that is overlaid on top of the current content window of camera viewfinder. Then, the mosaic preview outline, optional cropping frame outline, and an outline showing a relative mapped position and size of the current content window of camera viewfinder are all represented as lines overlaying the display of the current content window of camera viewfinder. These lines can be of any desired thickness, style, or color. However, in a closely related embodiment, these lines overlaying the current content window of camera viewfinder were "embossed" using conventional image processing techniques so as to minimize visual interference with the use of the camera viewfinder.

In yet another related embodiment, a "callout mode" is used wherein the LCD display screen of the camera shows the normal mosaic preview image, but when the current content window of camera viewfinder shrinks below a minimum threshold (because of the growth of the mosaic preview image), a larger copy of the current content window of camera viewfinder is shown in a least densely populated area of the screen. Then a callout indicator, such as, for example, an outlined rubber band, arrows, lines, etc., connects the larger copy of the current content window of camera viewfinder to the smaller copy that is mapped to the corresponding location within the overall mosaic preview image.

In yet another embodiment, the mosaic preview is panned to allow portions of the mosaic preview to go "off screen" while keeping the current display window on-screen to avoid shrinking the mosaic preview to a point where it is hard to see sufficient detail in either the mosaic preview or the current content window.

Note that the features described above with respect to the scaling and/or panning of the mosaic preview (and of the current content window of camera viewfinder) are typically more important with display screens that are integral to digital cameras, as such screens are typically limited in both size and resolution. However, these same features may be used with screens or displays of any type or size.

3.4.3 Camera Viewfinder ("Current Content" Display Window):

As described above, the aforementioned "current content" window is basically a dynamic sub-region of the overall camera display which represents a display of whatever image is to be captured next, similar to a dedicated LCD "viewfinder" display screen of a conventional digital camera. However, unlike the viewfinder display of a conventional digital camera, this live current content window is dynamic in the sense that it is automatically mapped to a matching position within the overall mosaic preview image. As a result, the user can immediately see where a current image will fit into the existing overall mosaic.

In a tested embodiment, the current content window is highlighted using a visible border, such as a colored rectangle. However, any color, thickness or style of line can be used for this purpose. Further, in a related embodiment, rather then using lines to delimit the current content window, that window is simply overlaid in its corresponding location on the overall mosaic image which is itself dimmed or otherwise de-emphasized to offset the visibility of the current content window relative to the overall mosaic preview image. In either case, the point is to make it immediately apparent to the user where any new image that will be captured will fit into the existing mosaic.

As described above, as the mosaic preview image grows, the current content window of the camera viewfinder shrinks. This viewfinder window is then mapped to the matching position within the overall mosaic preview image. However, also as described above (see Section 3.4.2), various additional embodiments, including the aforementioned "fisheye," "overlay," and "callout" modes are used to avoid shrinking the current content window of the camera viewfinder below a size where it would be difficult for a user to see the content of that window.

In addition, because of the way in which the current content window of the camera viewfinder is automatically mapped to a matching location within the overall mosaic preview image, it is possible that the current content window may be partially off-screen (or even "broken" in the case of a 360-degree mosaic). Consequently, in one embodiment, in order to ensure that the viewfinder is always in one piece (and complete) when displaying the entire mosaic preview image, the mosaic preview image is paned (in any necessary directions) in order to keep the viewfinder roughly in the middle of the screen. However, in order to keep the current content window from moving about too much within the overall display screen, hysteresis is used to reduce panning motions, i.e., the viewfinder is allowed to leave the center by a certain amount (50% in a tested embodiment); then, the screen is panned only if the current content window of the camera viewfinder would otherwise go beyond that threshold. Note that this panning may be used in combination with any of the mosaic preview scaling techniques described above in Section 3.4.2.

Figure 8:
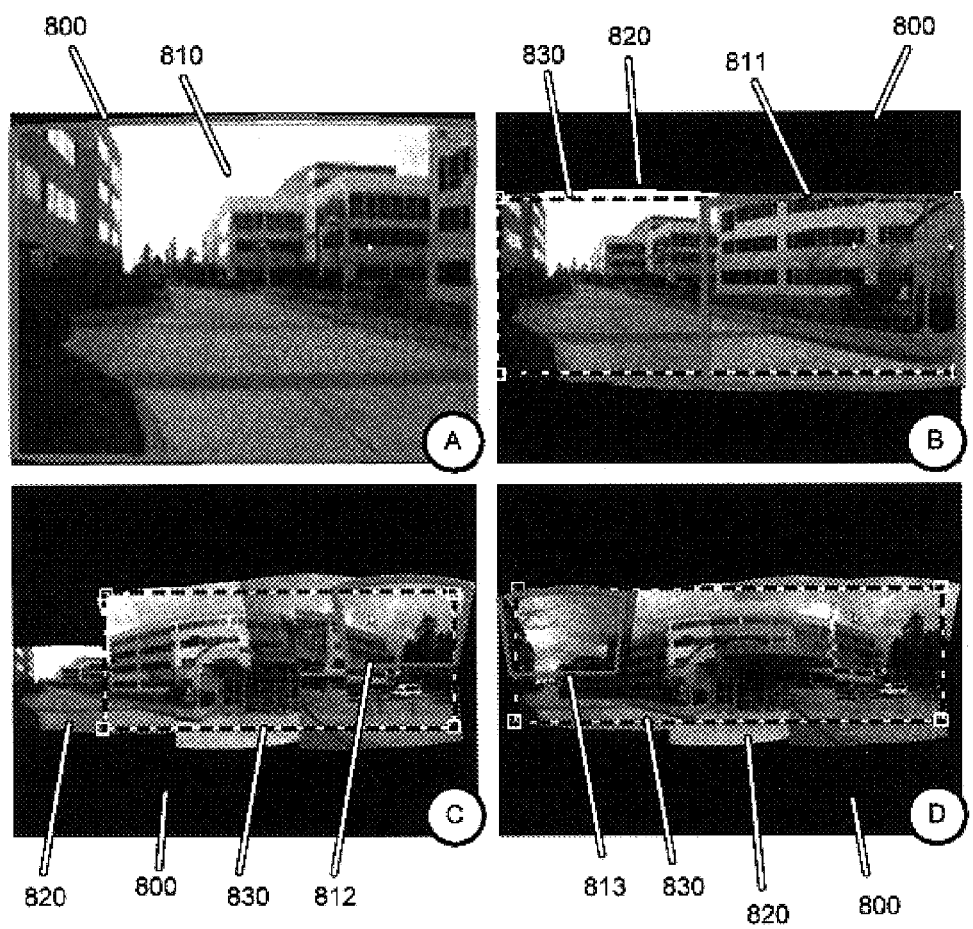
FIG. 8 is a sequence of four pictures of a display device upon which the Panoramic Viewfinder is implemented, illustrating: A) a first captured image of a scene; B) capture of additional images of the scene, visible cropping frame and the current content window of the camera viewfinder; C) capture of additional images of the scene, visible cropping frame and the current content window of the camera viewfinder (wherein the current content window is warped to reflect warping of the current image relative to its incorporation into the mosaic preview; and D) capture of additional images of the scene, visible cropping frame and the current content window of the camera viewfinder (wherein the current content window is warped to reflect warping of the current image relative to its incorporation into the mosaic preview.

For example, FIG. 8 illustrates the concepts of the growth of the mosaic preview image and the corresponding shrinkage and mapping of the current content window of the camera viewfinder. In particular, FIG. 8 provides a sequence of four pictures of a display device upon which the Panoramic Viewfinder is implemented. As illustrated in image (A) of FIG. 8, a first captured image of a scene 810 is displayed as filling essentially the entire LCD display screen 800. Next, as illustrated in image (B), as soon as a second image 811 is captured the content of the LCD display 800 changes in several ways. First, as soon as the camera captures a second (or subsequent) image 811 for the mosaic, a mosaic preview image 820 is generated by stitching that new image into the existing (or new) mosaic. Note that the size of the image 811 captured in the current content window 811 in image (B), as illustrated by the red outline, is significantly smaller than the corresponding window (810) in image (A).

Next, as illustrated in images (C) and (D) of FIG. 8, the mosaic image 820 continues to grow as additional images 812 and 813 are captured in the corresponding current content windows. In addition, the optional cropping frame 830 displayed as an overlay to the mosaic preview also continues to grow. Conversely, in each of these images, the size of the current content window (812 and 813) continues to shrink relative to its mapped location within the overall mosaic preview image 820.

In addition, as a mosaic grows, it is typically necessary to warp images to accomplish the stitching of those images into the growing mosaic. This warping is typically necessary to account for differing camera angles and perspectives used to capture the various images. Consequently, as illustrated in the progression of images in FIG. 8, the warping of the images in the current content window (progression from 810 to 811 to 812, and finally to 813) is illustrated by an increasingly non-rectangular current content window. It is interesting to note that in the progression of images in FIG. 8, the images captured (810, 811, 812, and 813) for construction of the mosaic preview 820 were not captured in any particular order or direction. The Panoramic Viewfinder simply identified the proper location, scaling, and warping of those images and stitched them into the overall mosaic, without requiring the user to captures images in a specific direction, overlap, or orientation.

Figure 9:
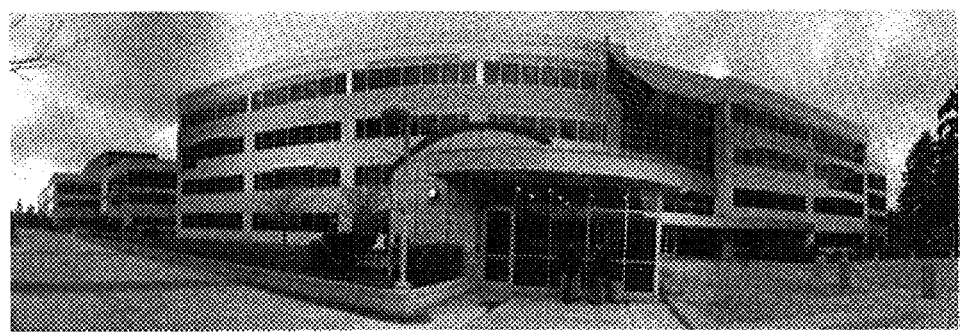
FIG. 9 illustrates a final cropped panoramic image constructed based on the panoramic preview and cropping frame illustrated in image (D) of FIG. 8.

The cropped final mosaic panorama generated based on the cropping frame 830 and mosaic preview 820 of image (D) of FIG. 8 is illustrated in FIG. 9. Further, it should be noted that while the various stitched images comprising the mosaic preview in image (D) of FIG. 8 exhibit various brightness levels, the final mosaic panorama illustrated in FIG. 9 has seamlessly blended these images into a single consistent view of the overall panorama.

Figure 10A:
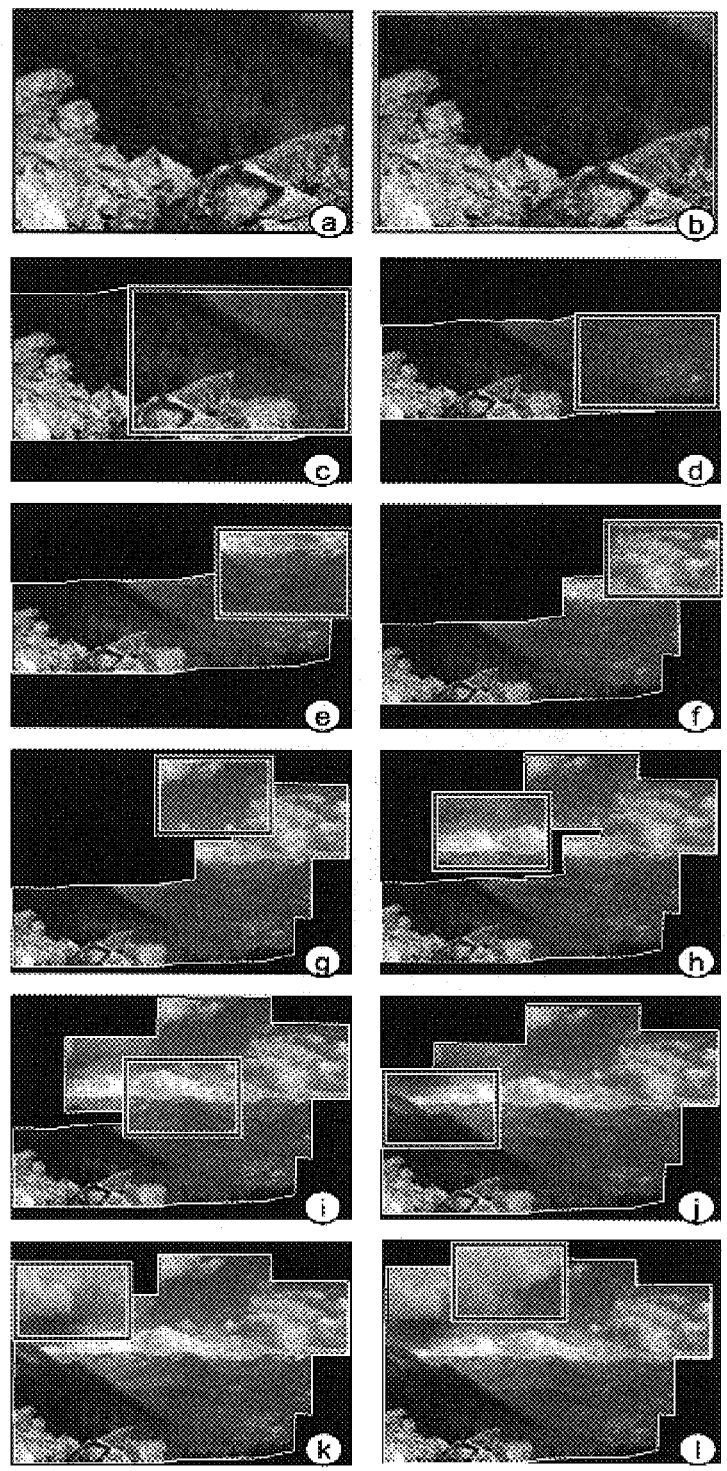
FIG. 10A is a sequence of twelve pictures of a display device upon which the Panoramic Viewfinder is implemented, illustrating a sequential capture of a set of images, the growth of the corresponding mosaic preview, and dynamic mapping of the current content window of the camera viewfinder.

FIG. 10A illustrates another example of the concepts of the growth of the mosaic preview image and the corresponding shrinkage and mapping of the current content window of the camera viewfinder similar to the example described with respect to FIG. 8. However, unlike the images of FIG. 8, the sequence of 12 images (image (A) through image (I)) provided in FIG. 10A show that the current content window of the camera viewfinder is a fixed rectangular shape (but not a fixed size). In this embodiment, the current content window retains its rectangular shape while the preview of the mosaic itself is warped around the rectangular current content window.

As with FIG. 8, the sequence of images presented in FIG. 10A generally shows the construction, growth, and scaling of the mosaic preview image and the corresponding mapping and scaling of the current content window. Note that the optional cropping frame is not displayed in this sequence of images. Again, as with the sequence of FIG. 8, the images captured for construction of the mosaic preview shown in FIG. 10A were not captured in any particular order or direction. The Panoramic Viewfinder simply identified the proper location, scaling, and warping of those images and stitched them into the overall mosaic, without requiring the user to captures images in a specific direction, overlap, or orientation.

3.4.4 Cropping Frame:

As noted above, the optional "cropping frame" is simply a rectangular region that is highlighted within the mosaic preview for indicating the portion of mosaic preview that will survive automatic cropping to a rectangular region. The extents of the cropping frame are determined by analyzing the mosaic preview to determine the largest contiguous rectangular section that can be extracted from the mosaic preview without having any gaps along any of the edges. Further, this cropping frame is dynamic in the sense that it automatically moves, scales, and adjusts (in both the X- and Y-axes) to the largest possible rectangular size that can be cropped from the existing mosaic preview image whenever any new images are stitched into the mosaic preview. Note that in one embodiment, gaps in the interior of the mosaic are allowed without affecting the extents of the cropping frame. However, in one embodiment (as described in further detail in Section 3.4.5), the user is automatically alerted to such gaps.

There are a number of ways to use the cropping frame to highlight the content that will survive cropping. For example, in one embodiment, the cropping frame is implemented either with, or without, visible lines by de-emphasizing portions of the mosaic preview outside of the internal area of cropping frame. In another embodiment the cropping frame is implemented using a "marching ants" type rectangular frame, wherein an animated dotted-line marquee is used to indicate a rectangular selection of a portion of the mosaic preview. One advantage of using this type of cropping frame is that many users are familiar with object selection in images using animated dotted line techniques such as conventional marching ants type selection indicators. Further, both de-emphasis and lines (either fixed or animated) may be used in combination to indicate the extents of the cropping frame.

Figure 10B:
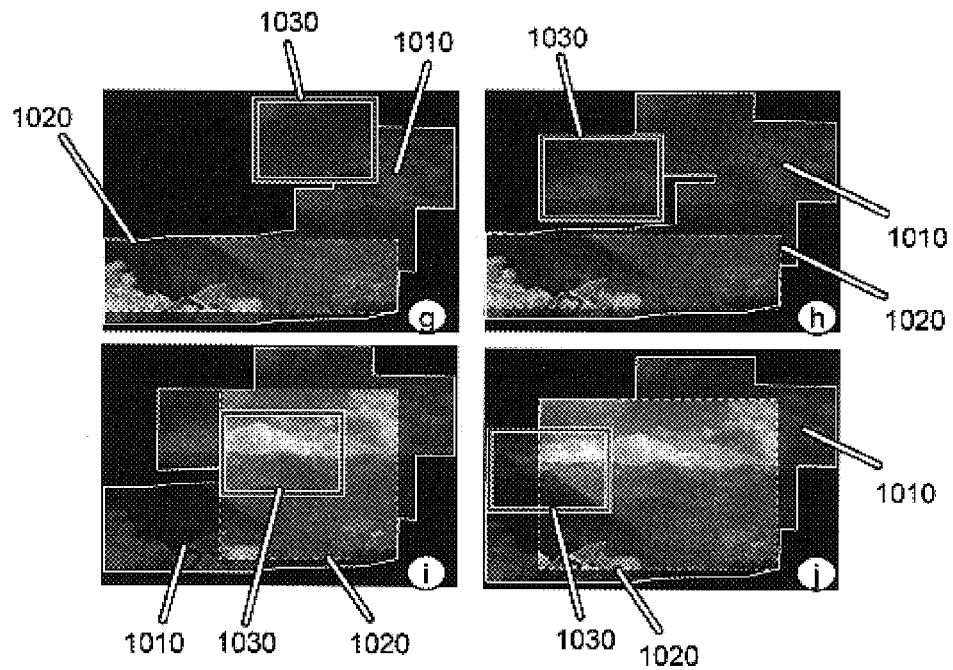
FIG. 10B is a subset of four of the images of FIG. 10A, illustrating various embodiments of the Panoramic Viewfinder, including use of the cropping frame, and de-emphasis of areas of the mosaic preview and the current content window of the camera viewfinder that are outside of the extents of the cropping frame.

For example, as illustrated in FIG. 10B, the use of cropping frames may be used with de-emphasis of areas outside of the boundaries of the cropping frame. In particular, FIG. 10B illustrates a subset of four of the images from FIG. 10A (images (G), (H), (I) and (J)). However, while the cropping frame 1020 was turned off in the images provided in FIG. 10A, it has been turned on in the images of FIG. 10B. Further, FIG. 10B shows that areas of the mosaic preview 1010 outside of the cropping frame 1020 are de-emphasized by reducing the brightness or luminance of those regions of the mosaic preview. In addition, in another embodiment, also as illustrated by FIG. 10B, the content (or parts of the content) within the current content window 1030 is also de-emphasized if the mapped location of the current content window falls outside of the cropping frame 1020.

In a tested embodiment, the area outside the cropping frame, i.e., the area that will be discarded was de-emphasized by reducing brightness and contrast on the order of about 57%, i.e., black is mapped to black, and white is mapped to 57% gray (=147 on a 0-255 scale). Further, in a related embodiment, de-emphasis can be manually turned off by the user, e.g., to allow better visibility of an LCD display in bright sunlight, or simply as a matter of user preference. The cropping frame itself was rendered in a tested embodiment by offsetting the luminance of the affected pixels by 128, computed as luminance=(luminance+128) % 256. This means that the "ants" are darker on light background, lighter on dark background, and change brightness abruptly at 50% luminance.

However, the readability of the camera viewfinder (current content window) is of particular importance, as users rely on it to locate scene elements and to verify that frames were taken correctly. Consequently, to ensure that readability, in one embodiment, the current content window is never de-emphasized, even if located partially or fully outside the cropping frame. However, in a related embodiment, the "marching ants" visuals of the cropping frame remain visible as an overlay on the current content window in order to keep the cropping frame consistent, and to show the user where the new frame will fit into the growing mosaic.

Further, while the cropping frame never crosses the rim of the mosaic preview (since such crossing would result in gaps or flaws in the resulting panorama), it tends to coincide with that rim over extended streaks. In this case, only the marching ants of the cropping frame are rendered, and no solid border around the mosaic preview will be rendered in that location. One advantage of this approach is that there tends to be less visual interference than attempts to separate the rim and the cropping frame, e.g., by shrinking the cropping frame by a few pixels or by rounding the corners of the cropping frame.

Finally, when the cropping frame changes (as a result of the stitching of additional images), by growing a step or by changing shape, it takes on its new shape instantly. While the use of a slow-in slow-out type animation has been implemented in one embodiment, such animation has been observed to reduce apparent responsiveness of the Panoramic Viewfinder.

In a tested embodiment, the cropping frame was computed in real-time since the user interface underlying Panoramic Viewfinder relies heavily on its ability to update the cropping frame quickly so that the user can immediately see the extents of the resulting panorama. The following discussion describes the technique used to provide the real-time computation of the cropping frame.

In particular, in one embodiment, the stitching algorithm of the Panoramic Viewfinder outputs the panorama as an alpha-matted composite bitmap image. In order to size and place the cropping frame, the system computes the largest interior rectangle that contains only fully opaque pixels. The problem of computing the largest inscribed rectangle in an arbitrary shaped polygon has been studied in the computational geometry community. However, conventional techniques require the geometry to be described as a polygon, which does not cover cases involving interior transparent regions (such as a gap in the mosaic that needs to be filled by capturing additional images). Also, converting the rounded outlines of a panorama (resulting from warping of the input images to map them into the panorama) to a polygon can be computationally expensive. Consequently, in this tested embodiment, computation of the cropping frame is performed based on a pixel-based representation of the panorama.

For example, at the highest level, computation of the cropping frame proceeds by testing all possible combinations of top-left and bottom-right corners, thereby testing all possible rectangles that can be inscribed within a given region. This technique obtains real-time performance by eliminating top-left corners of boxes with expected areas lower than a moving upper bound and by limiting the search for the bottom right corners to a linear number of possible candidates.

By doing this, the computational complexity of determining the cropping frame has a complexity of roughly $O(n^2)$, with n being the width of the picture, which is suitable for real-time use. The detailed steps in this process are described below:

Step 1—Down-Sampling: For faster performance, computation of the cropping frame begins by creating a version of the panorama bitmap that is down-sampled. In a tested embodiment, the bitmap was downsampled by a factor of four. However, other downsampling factors can also be used, depending upon the computational processing power available. All further computation takes then place on this down-sampled version of the bitmap.

Step 2—Pre-Compute Span Lengths: When computing rectangle surfaces, information about the length of spans is used. Since the same span information is used repeatedly, it is cached as described below. First, two arrays are created, for purposes of explanation, the first array will be called "width image," and the second image will be called "height image." For each pixel, width image stores the length of the horizontal span to the right of this pixel, height image stores the length of vertical span below this pixel. Both are created simultaneously by traversing the panorama from last row to first row and each of these rows from last column to first column. Since each span value is generated based on its right or bottom neighbor, this step requires $O(n^2)$ operations.

Step 3—Compute Rectangle Surfaces: Next, computation of the cropping frame continues by searching for the largest interior rectangle. This search begins by initializing the largest found rectangle to area 0. Then it traverses the image top-down and left to right:

(a) At each pixel location an upper bound for the size of the largest possible rectangle whose top-left corner is at that pixel location is computed. The upper bound is computed as the product of the horizontal span times the vertical span—both are looked up in the width image and height image arrays.

(b) If the upper bound is smaller than the current best (largest) then this pixel cannot be the top-left corner of the sought rectangle and the next pixel is evaluated.

(c) If the upper bound is larger than the current best, then the true largest rectangle with this particular top-left corner is computed. In order to do so, the computation proceeds by traversing down the current column of the width image array looking for the bottom left corner that results in the largest rectangle surface. During this traversal, the largest rectangle created by any bottom left corner is identified. This computation also keeps track of the length of the shortest horizontal span seen so far in the column being traversed. The width of a rectangle with a given bottom left corner is the shortest span seen above.

For each pixel in that column, the surface of the rectangle that has the respective pixel as its bottom right corner as the product or that width times its distance from the top left corner is computed. The best (largest) value is updated until all pixels are traversed.

In the worst case, Step 3, as described above, takes $O(n^3)$ operations. However due its ability to terminate early, it has been observed that in practice it is closer to $O(n^2)$ and is suitable for our real-time requirements. Interestingly, performance analysis shows that the computational technique described above spends 80% of its time in Step 1. Consequently, in one embodiment, the cropping frame computation process described above is further optimized by iteratively computing the width image and height image arrays as new input images are added to the growing panorama, rather than re-computing the entire array for each new image. As a result, the computational overhead devoted to Step 1 for computing the largest cropping frame is reduced.

3.4.5 Alerting the User to Problems in the Mosaic:

As noted above, the user interface of the Panoramic Viewfinder also includes visual alerts, warnings, or instructions relating to particular problems identified in the stitched mosaic. For example, while taking images for a panorama several problems can occur, such as: the stitching algorithm losing track of the camera viewfinder (and it will therefore not be able to stitch an image captured at that time); a flaw, such as a ghosting or focus problem, may be detected; or a gap or other defect within the interior of the cropping frame may be detected. One of the central benefits of combining real-time on-the-fly stitching with a user interface coupled to the digital camera is that the Panoramic Viewfinder can immediately inform the user about these problems and can help resolve them interactively.

For example, when the Panoramic Viewfinder identifies a flaw in the mosaic, such as a missed area of a scene, a ghosting problem, insufficient overlap for successful stitching and blending, etc., one approach is to simply shrink the cropping frame to avoid the problem areas. However, it is typically safe to assume that if the user is capturing pictures over a large area, the user likely wants to capture a large panorama. Consequently, in one embodiment, in cases where the identified flaw does not intersect a border of the cropping frame, the Panoramic Viewfinder assumes that the user would rather take a large mosaic picture with the identified flaw than a consistent, but relatively small mosaic.

As a result, the Panoramic Viewfinder allows the cropping frame to grow over the flaw. However, in order to allow the user to correct the flaw before it is too late, the flaw is highlighted with an animated pattern and/or text alert to draw the user's attention to the flaw. The user can then simply pan the camera viewfinder over that area, and retake one or more pictures, as necessary, thereby filling in the missing or flawed material, and subsequently eliminating the warning as the problem is corrected. Note that when retaking images or "brushing over" an area identified as having a problem, the Panoramic Viewfinder will analyze any redundant image information and automatically select the best content from the redundant information in correcting the flaw in the panorama.

With respect to ghosting, if scene elements move while the panorama is taken, objects can appear discontinuous across frames (i.e., "ghosting"). The stitching algorithm of the Panoramic Viewfinder detects ghosting based on differences between the two overlapping versions of matched frames. If the Panoramic Viewfinder detects "ghosting" it marks or otherwise highlights the ghosted area, such as by covering the area with a bright red rectangle, or other alert or icon. Then, when the user fixes the ghosting by brushing over that area again the ghosting warning disappears.

As noted above, another potential problem that may occur in constructing image mosaics is that for any of several reasons, stitching algorithms sometimes lose track of where an image should fit into an overall mosaic. Consequently another alert provided to the user is a "stitching failure" or "lost track" type alert.

In particular, in one embodiment, when the stitching algorithm fails, such that it is unable to connect a frame to the rest of the panorama, the user is alerted. In the case of real-time stitching the frame to be stitched is always the viewfinder content, so being unable to stitch always also means that the system has lost track of where the camera lens is looking with respect to the overall mosaic. When this happens, the Panoramic Viewfinder continues to show the viewfinder content, but it does not know where to fit that image into the mosaic. When lost, the stitching algorithm of the Panoramic Viewfinder continuously attempts to match what it sees through the viewfinder to the mosaic, and also alerts the user to the problem so that the user can assist the stitching algorithm of the Panoramic Viewfinder in regaining track.

Figure 12:
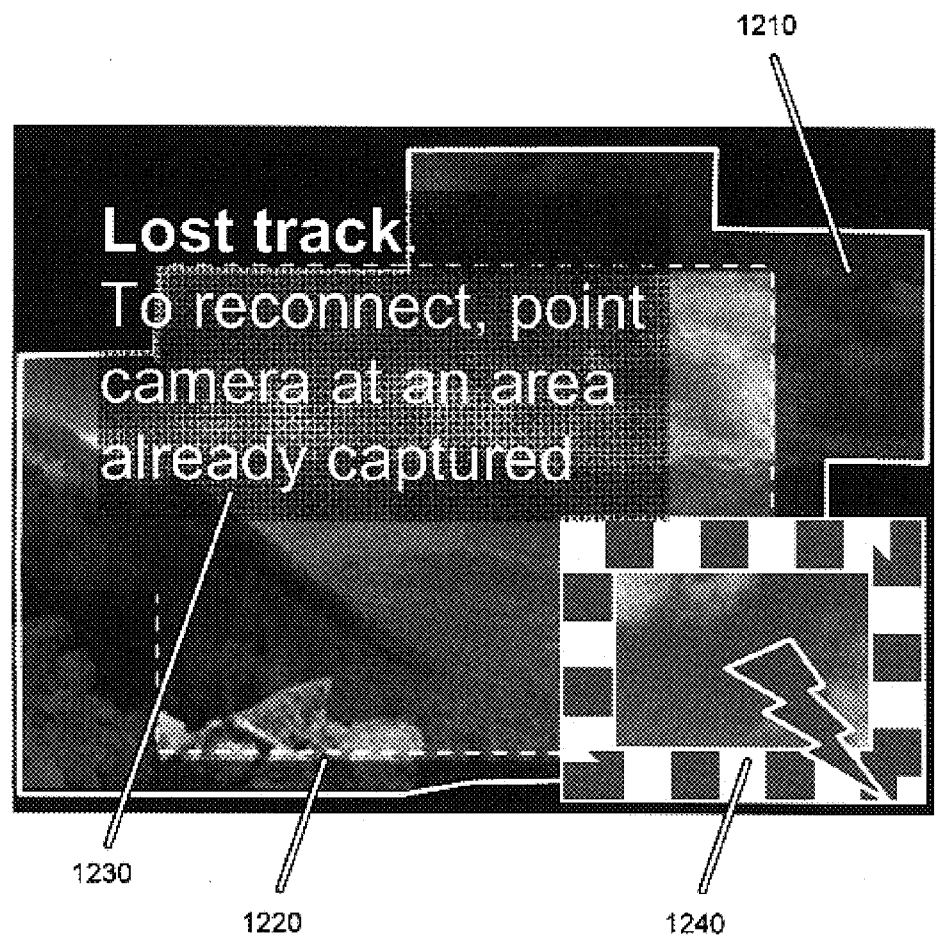
FIG. 12 illustrates an embodiment of the Panoramic Viewfinder wherein stitching failures (loss of tracking with respect to the current image relative to the existing mosaic) are identified to the user.

For example, as illustrated by FIG. 12, when lost, the Panoramic Viewfinder continues to display the optional cropping frame 1220 of the overall mosaic preview 1210, and also informs the user about the stitching disconnect problem through an error message 1230 on screen, such as, for example a text message stating: "Lost track. To reconnect, point camera at an area already captured." At the same time, the viewfinder's frame changes to alert the user to the problem. One example of such an alert is to increase the size of the outline around the current content window 1240 of the camera viewfinder and to optionally add additional animated on non-animated icons to indicate the problem (such as, for example, the lightning bolt shown in FIG. 12, or some other icon or indicator). Further, since the current content window can no longer be mapped to the mosaic, it is moved to a position as far away as possible from the last captured (and successfully stitched) frame to prevent it from occluding the area most likely to help with reconnecting the stitching algorithm, i.e., the last frame.

In addition, in one embodiment, the Panoramic Viewfinder tries to tell the user how to prevent the same error from recurring. Consequently, the specific error message provided to the user depends on the stitching algorithm's hypothesis of why it lost track. For example, if the first unmatched frame contained very little texture (i.e., a clear blue sky), the stitching algorithm will suspect that this lack of texture was responsible for losing track. Since this implies that it would keep losing track on that area repeatedly, problem specific advice is displayed which states something similar to: "Area has too little texture to be matched. Try zooming out before capturing additional images." Zooming out is likely to help the stitching algorithm since it will increase the chances of including a distant landmark when moving back into the low texture area. Again, it should be noted that the stitching algorithm of the Panoramic Viewfinder is capable of scaling and warping images to stitch them into the panorama. Consequently, zooming out and capturing images will not cause problems in constructing the mosaic (although the resolution of zoomed out areas may be somewhat decreased relative to the resolution of non-zoomed areas).

Alternately, if the frame did have sufficient texture, too little overlap between frames is the most likely explanation for loss of track. In this case, the Panoramic Viewfinder will again provide problem specific advice by suggesting something similar to: "Try again, but move the camera more slowly, or provide a greater area of image overlap." Note that when taking pictures automatically as the user pans the camera, the Panoramic Viewfinder continuously monitors the user's panning speed. In a related embodiment, whenever the user moves so fast that the overlap between frames drops below some predetermined threshold, the Panoramic Viewfinder will alert the user that the panning speed has exceeded a maximum allowable panning speed. The Panoramic Viewfinder will then warn the user to decrease the panning speed, or not to exceed the current panning speed. In another related embodiment, a dynamic "speed gauge" or the like is used to show the users speed with respect to the highest possible panning speed (computed as a function of the measured overlap between images at the current frame rate). As a result, the user is immediately able to determine whether they can speed up or should slow down the panning speed.

3.5 User Interaction with the Panoramic Viewfinder:

As noted above, one of the advantages of the Panoramic Viewfinder is that user interaction with the Panoramic Viewfinder is very similar to what most users of digital cameras are already familiar with. For example, the controls of a conventional digital camera generally include a mode selector and a shutter button. In the simplest embodiment, the Panoramic Viewfinder described herein offered those same basic controls by providing an automatic shooting mode (as the user pans the camera) and by slaving the cropping frame to the panorama rather than requiring the user to identify or delimit the extents of the cropping frame.

Further, as described above, users control the cropping frame indirectly, i.e., they expand the cropping frame by simply taking more pictures. However, in one embodiment, a camera control for reducing the size of the cropping frame is provided in the event that user has captured more images, or a larger panorama than was intended. In this case, the user is presented with controls for shrinking the cropping frame horizontally and/or vertically to achieve the desired coverage for the final panorama. However, it should be noted that in one sense, such a control may be considered redundant in that the user can always simply crop the panoramic image to any desired size using post-hoc processing of any panoramas generated by the Panoramic Viewfinder.

3.7 Additional Embodiments of the Panoramic Viewfinder:

As noted above, various embodiments of the Panoramic Viewfinder includes additional capabilities, such as, for example, the capability to reduce storage requirements by automatically deleting redundant image content; reducing storage requirements by performing final offline image stitching (with real-time preview stitching being provided to the user while images are being captured); and various methods for triggering when images are captured.

Given these various additional embodiments, there are several things that the user can do or enable in order to provide more storage space for additional images or larger mosaics. For example, below are several options of how users might configure the Panoramic Viewfinder to perform real-time and/or post-hoc operations:

1. Stitch images in real-time, auto-crop the mosaic to the boundaries of the cropping frame when the mosaic is complete and discard the raw images.
2. Stitch images in real-time, and either crop or not, but also save the raw images.
3. Perform preliminary stitching, store spatial relationship data for images, keep raw images and perform post-hoc stitching using the stored spatial relationship information to initialize the off-line stitching.

3.7.1 Reducing Storage/Memory by Deletion of Redundant Information:

As noted above, in one embodiment, the available memory for storing additional images is automatically increased by deleting redundant image information in real-time, as soon as any redundant information is identified as a result of stitching and image overlap. In operation, this embodiment is either manually enabled or disabled by the user, or automatically enabled as a function of remaining storage space within the digital camera.

In a related embodiment, redundant image information is simply not recorded at all. In particular, as noted above, in one embodiment, images are captured automatically as the user pans the camera over the scene to be captured for generation of panoramas. However, rather then capturing images at a particular frame rate, images are captured as a function of a computed overlap between existing and new image frames as the camera moves over the scene. In addition, in one embodiment, when "brushing" over an already traversed area, the stitching algorithm of the Panoramic Viewfinder only keeps the better of the two passes as a function of various parameters, including, for example, how well each image matches the existing mosaic, the computed focus of the images, and whether either of the images will introduce ghosting into the mosaic.

3.7.2 Reducing Storage/Memory by using Offline Stitching:

As noted above, another method for saving storage space is to perform offline stitching so as to avoid saving the stitched panorama within the potentially limited memory of the digital camera. In this embodiment, preliminary stitching is performed in a manner sufficient to do two things: 1) generate the mosaic preview image for display on the camera LCD screen (or other display device); and 2) determine the spatial relationships between the images that are being preliminarily stitched.

Once the relative positions of the image have been determined, that spatial information is simply stored as numeric information and used to initialize the subsequent offline stitching of images. In addition, along with this determination of spatial relationships between images, the amount of overlap will also naturally be determined as a part of this effort. Consequently, in a related embodiment, redundant image information is deleted, as described above to free up more camera storage space for additional images.

The foregoing description of the Panoramic Viewfinder has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Panoramic Viewfinder. It is intended that the scope of the invention be limited not by this detailed description, but rather by the claims appended hereto.

What is claimed is:

1. A camera for automatically generating mosaic images from a set of images of a scene, comprising:
    a device for performing real-time generation of a mosaic image from images captured by the camera;
    a display screen for displaying the mosaic image;
    a display window showing a current view through the camera lens of a next image frame to be possibly captured by the camera, said display window being automatically mapped in real-time to a corresponding location on the mosaic image being displayed on the display screen; and
    a device for automatically displaying, on the display screen, alerts regarding a loss of tracking between the display window showing the current view through the camera lens and the mosaic image being displayed on the display screen, said alerts including suggestions as to how to reacquire the tracking for automatically mapping the display window to the corresponding location on the mosaic image.

2. The camera of claim 1 further comprising a device for mapping a cropping frame to the mosaic image.

3. The camera of claim 2 wherein the cropping frame represents extents of a largest possible continuous panorama that can be extracted from the mosaic without allowing gaps of image data along any border of the cropping frame.

4. The camera of claim 1 further comprising a device for automatically displaying, on the display device, warnings regarding flaws in the mosaic image.

5. The camera of claim 1 further comprising a device for automatically triggering image capture as function of a computed image overlap as a user pans the camera over a scene.

6. The camera of claim 1 further comprising a device for automatically identifying and deleting redundant image information as each image is added to the mosaic image during real-time generation of the mosaic image.

7. The camera of claim 1 further comprising a device for automatically scaling the mosaic image to fit the extents of the display device as images are added to the mosaic in real-time.

8. The camera of claim 7 further comprising a device for automatically scaling the display window mapped to the mosaic image as a function of the scaling of the mosaic image.

9. A computer readable medium having computer executable instructions for automatically generating real-time mosaic preview images, said computer executable instructions comprising:

receiving a plurality of input images of a scene from an input camera;

constructing a mosaic image in real-time from the input images as each image is received from the input camera and displaying the mosaic image on a display device coupled to the input camera;

displaying a current view of the input camera in real-time as a mapped overlay on the displayed mosaic image;

displaying an automatically sized cropping frame as a mapped overlay on the mosaic image, said cropping frame illustrating an area of the mosaic image that will remain following automatic cropping of the mosaic image; and wherein the cropping frame represents extents of a largest possible panorama that can be extracted from the mosaic image without allowing gaps of image data along any border of the cropping frame.

10. The computer-readable medium of claim 9 further comprising automatically detecting defects in the mosaic image, and providing automatic alerts via the display device, said alerts being specific to a type of defect that is identified.

11. The computer-readable medium of claim 10 wherein the type of defect that is identified includes any of:

ghosting related defects;

image gap related defects; and loss of tracking defects relating to any of mapping of the current view of the input camera to the mosaic image and mapping one of the input images to the mosaic image for use in constructing the mosaic image.

12. The computer-readable medium of claim 9 wherein the mosaic image that is constructed is a low-fidelity preview image, and wherein preliminary image stitching information regarding spatial relationship data between the input images used to construct the low-fidelity preview image is stored and used to initialize post-hoc stitching of the input images to construct a final mosaic image.

13. The computer-readable medium of claim 9 wherein the mosaic image is a final mosaic image, and wherein the input images used to construct the final mosaic image are automatically discarded as each image is added to the final mosaic image.

14. The computer-readable medium of claim 9 further comprising automatically triggering image capture from the input camera as function of a computed image overlap as the camera is panned over a scene.

15. A system for generating mosaic images via an interactive viewfinder display comprising:

providing a plurality of input images from a camera device to a computing device in real-time as the images are captured by the camera device, said images not having any predefined spatial relationships and said camera device having an arbitrary position with respect to each image;

constructing a mosaic image in real-time from the input images as each image is received by the computing device from the camera device;

displaying the mosaic image on a display device coupled to the computing device in real-time as the mosaic is constructed in real-time from the input images;

displaying a viewfinder window showing a current view through a camera lens of the camera device, said viewfinder window being automatically mapped in real-time into a corresponding location on the mosaic image being displayed on the display device; and displaying an automatically sized cropping frame as a mapped overlay on the mosaic image, said cropping frame illustrating an area of the mosaic image that will remain following automatic cropping of the mosaic image.

16. The system of claim 15 wherein the computing device is integral to the camera.

17. The system of claim 15 further comprising automatically identifying and deleting redundant image information from the input images as each image is added to the mosaic image during real-time construction of the mosaic image.

18. The system of claim 15 wherein the mosaic image is a 360-degree mosaic image.

19. The system of claim 15 further comprising automatically detecting defects in the mosaic image, and providing automatic alerts via the display device, said alerts being specific to a type of defect that is identified.

* * * * *